(12) United States Patent
Shimauchi et al.

(10) Patent No.: US 10,375,305 B2
(45) Date of Patent: Aug. 6, 2019

(54) INFORMATION PROCESSING DEVICE, IMAGING DEVICE, INFORMATION PROCESSING METHOD, AND PROGRAM

(71) Applicant: SONY CORPORATION, Tokyo (JP)

(72) Inventors: Kazuhiro Shimauchi, Tokyo (JP); Atsushi Kimura, Tokyo (JP); Takashi Kohashi, Tokyo (JP); Masakazu Ebihara, Tokyo (JP)

(73) Assignee: SONY CORPORATION, Tokyo (JP)

( * ) Notice: Subject to any disclaimer, the term of this patent is extended or adjusted under 35 U.S.C. 154(b) by 253 days.

(21) Appl. No.: 14/782,884

(22) PCT Filed: May 16, 2014

(86) PCT No.: PCT/JP2014/002601
§ 371 (c)(1),
(2) Date: Oct. 7, 2015

(87) PCT Pub. No.: WO2014/199564
PCT Pub. Date: Dec. 18, 2014

(65) Prior Publication Data
US 2016/0050367 A1 Feb. 18, 2016

(30) Foreign Application Priority Data

Jun. 11, 2013 (JP) .................... 2013-122989

(51) Int. Cl.
*H04N 5/232* (2006.01)
*H04N 5/247* (2006.01)
*H04N 13/282* (2018.01)

(52) U.S. Cl.
CPC ..... *H04N 5/23238* (2013.01); *H04N 5/23293* (2013.01); *H04N 5/247* (2013.01); *H04N 13/282* (2018.05)

(58) Field of Classification Search
CPC .......... H04N 13/0282; H04N 13/0246; H04N 13/0425; G06T 7/85
See application file for complete search history.

(56) References Cited

U.S. PATENT DOCUMENTS

| | | | |
|---|---|---|---|
| 6,002,995 A * | 12/1999 | Suzuki | H04N 5/232 348/143 |
| 2007/0118281 A1* | 5/2007 | Adam | G01C 21/3647 701/431 |

(Continued)

FOREIGN PATENT DOCUMENTS

| | | |
|---|---|---|
| EP | 2 582 128 A2 | 4/2013 |
| JP | 2003-47026 A | 2/2003 |

(Continued)

OTHER PUBLICATIONS

Japanese Office Action dated Mar. 21, 2017 in Patent Application No. 2013-122989 (without English Translation).

(Continued)

*Primary Examiner* — Xiaolan Xu
(74) *Attorney, Agent, or Firm* — Oblon, McClelland, Maier & Neustadt, L.L.P.

(57) ABSTRACT

A system that suggests candidate installation states corresponding to each of a plurality of imaging devices based on a relationship between current installation states of each of the plurality of imaging devices; and outputs a suggested candidate installation state corresponding to at least one of the plurality of imaging devices based on the current installation state of each of the plurality of imaging devices and the determined candidate installation states.

15 Claims, 21 Drawing Sheets

(56) References Cited

U.S. PATENT DOCUMENTS

| | | | |
|---|---|---|---|
| 2009/0033740 A1 | 2/2009 | Ishikawa et al. | |
| 2009/0153650 A1 | 6/2009 | Misawa et al. | |
| 2010/0026788 A1 | 2/2010 | Ishikawa et al. | |
| 2011/0157373 A1* | 6/2011 | Ye ............................ | G06T 7/85 |
| | | | 348/187 |
| 2013/0093842 A1 | 4/2013 | Yahata | |

FOREIGN PATENT DOCUMENTS

| | | |
|---|---|---|
| JP | 2003-179800 | 6/2003 |
| JP | 2005-286619 A | 10/2005 |
| JP | 2006-33329 | 2/2006 |
| JP | 2009-10728 A | 1/2009 |
| JP | 2011-172093 | 9/2011 |
| JP | 2012-90106 A | 5/2012 |
| JP | 2012-138759 A | 7/2012 |

OTHER PUBLICATIONS

International Search Report dated Sep. 16, 2014 in PCT/JP2014/002601.

\* cited by examiner

[Fig. 1]
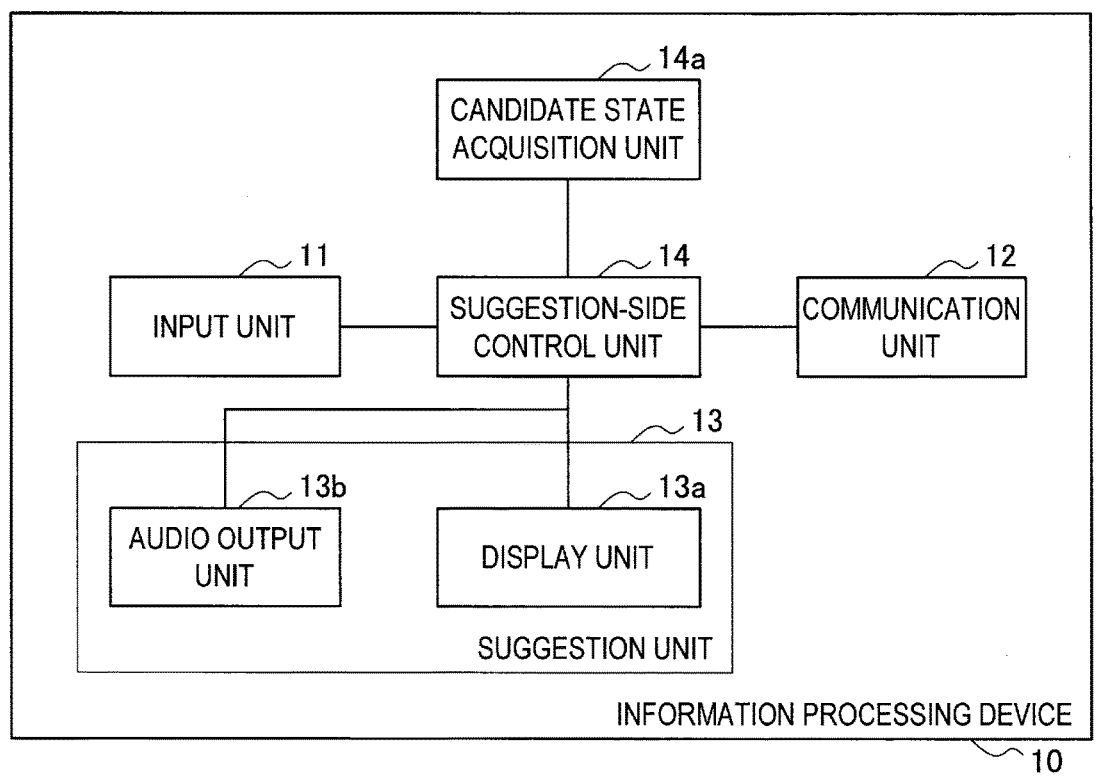

[Fig. 2]
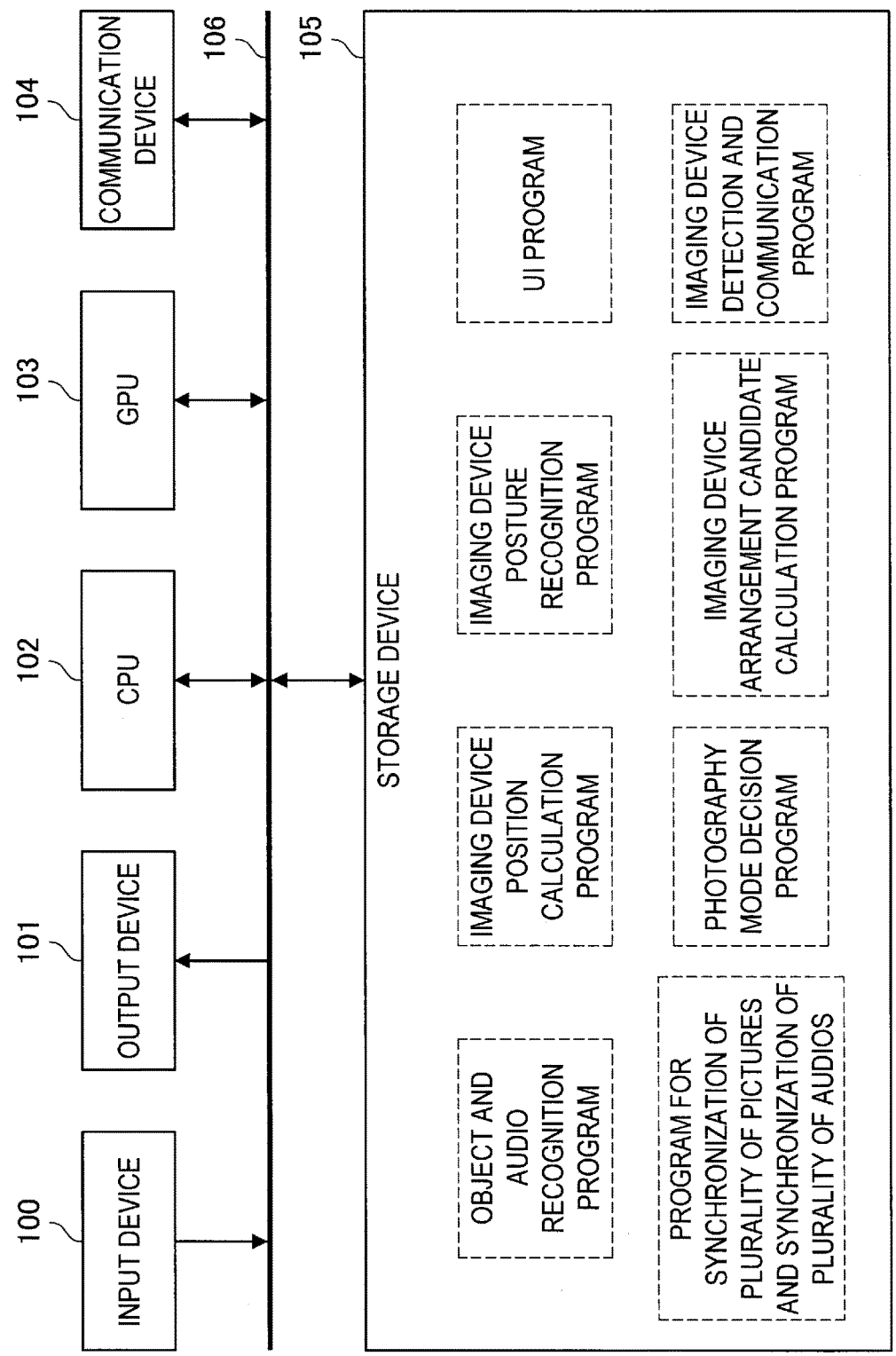

[Fig. 3]
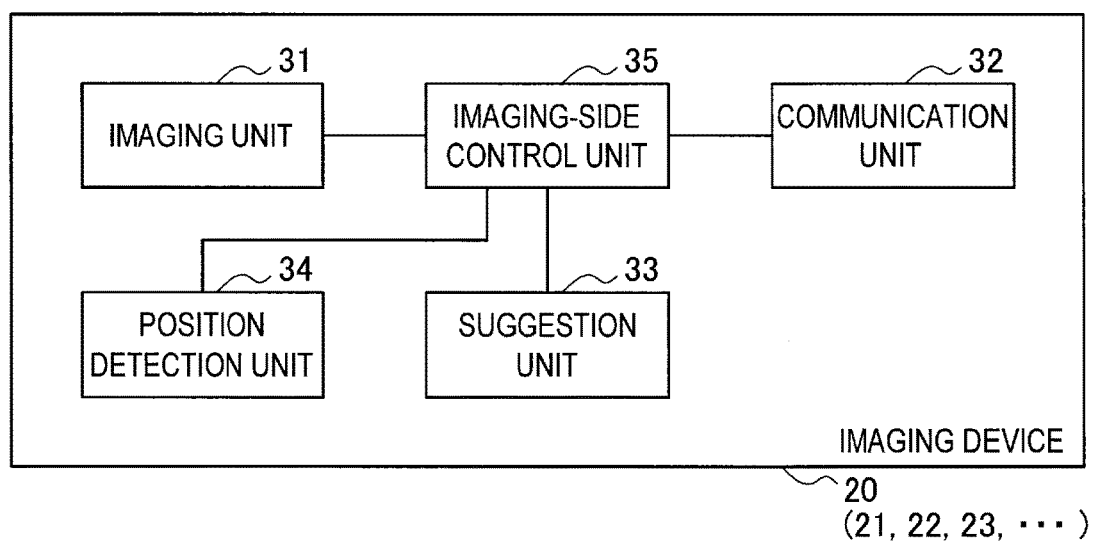

[Fig. 4]
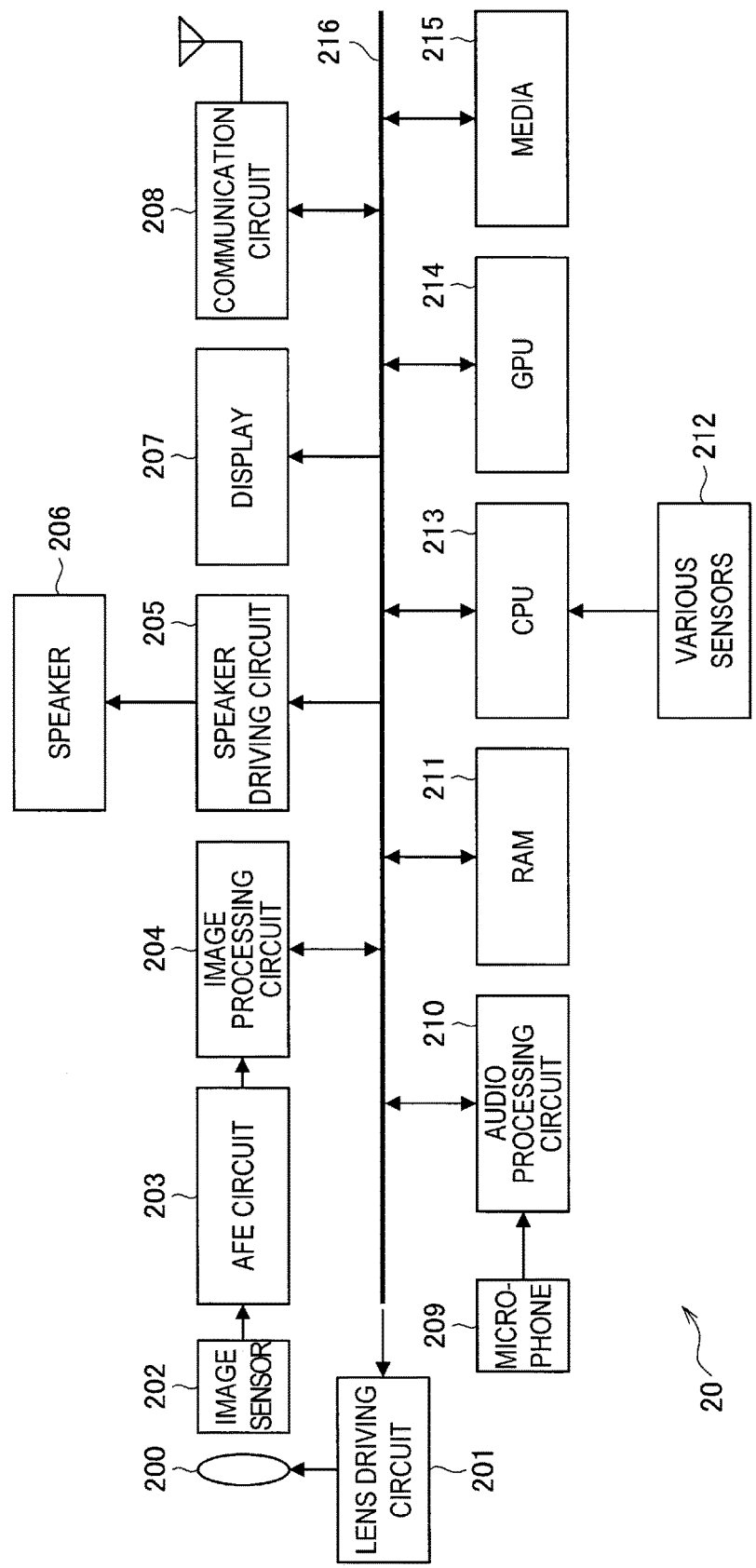

[Fig. 5]
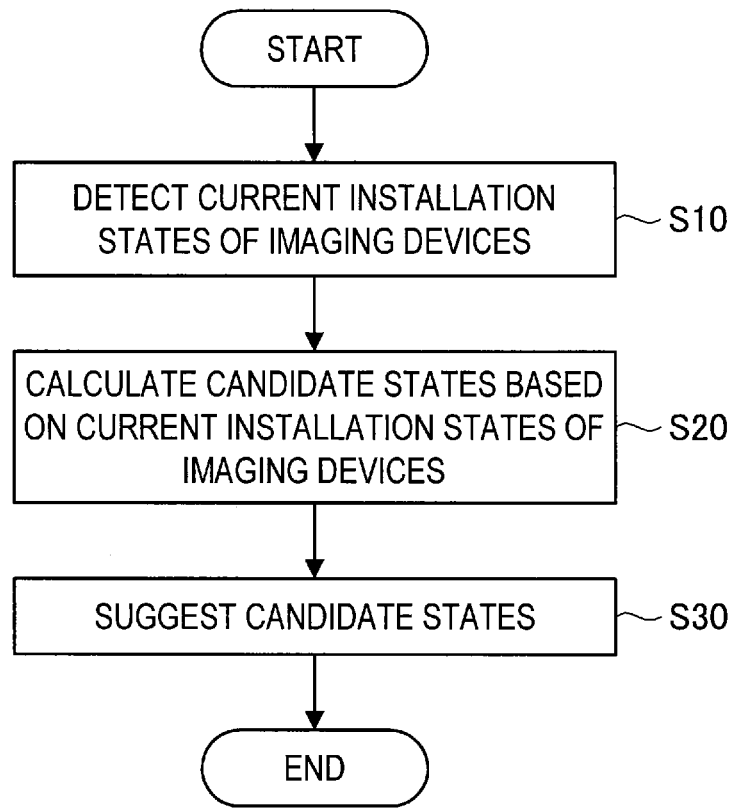

[Fig. 6]
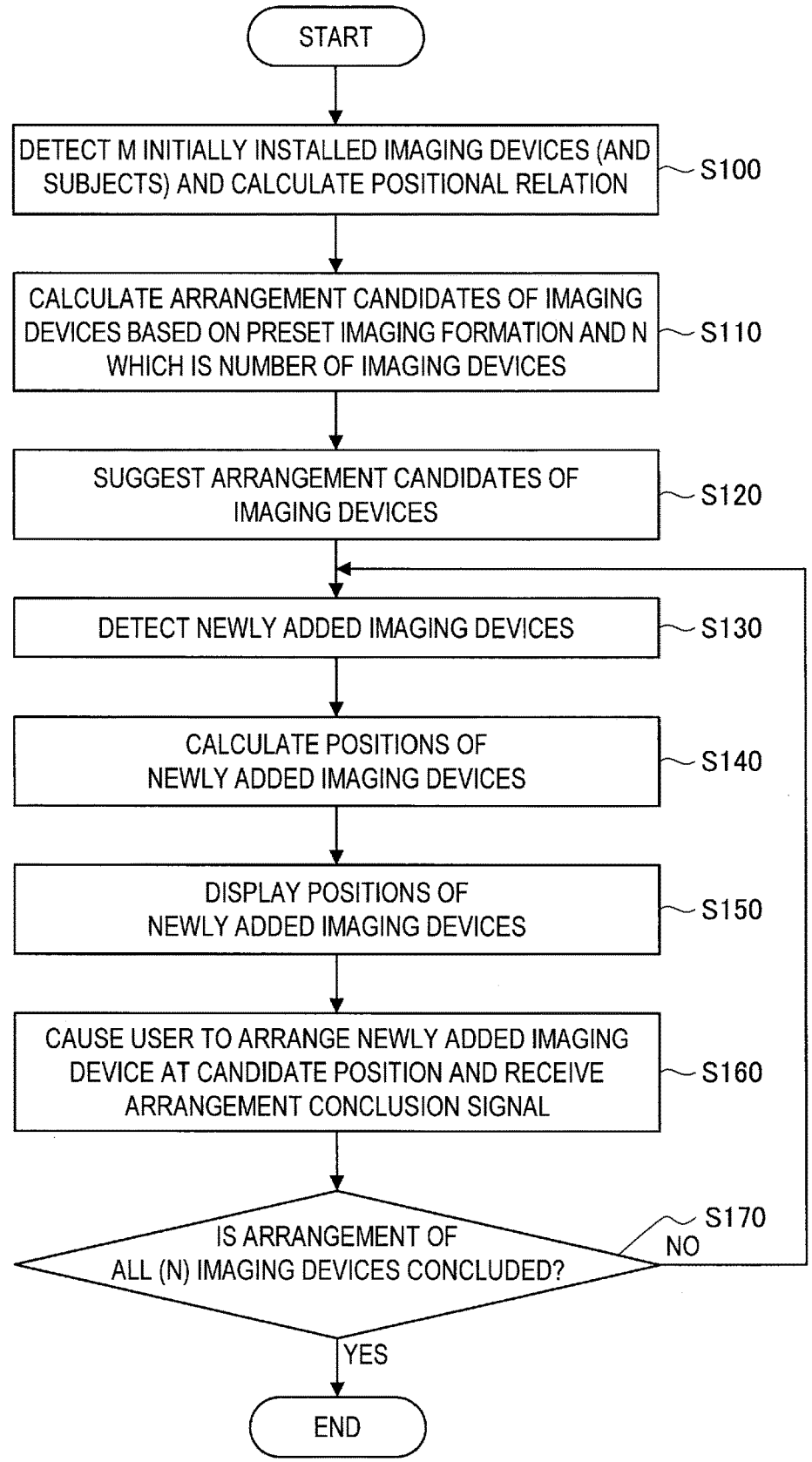

[Fig. 7]
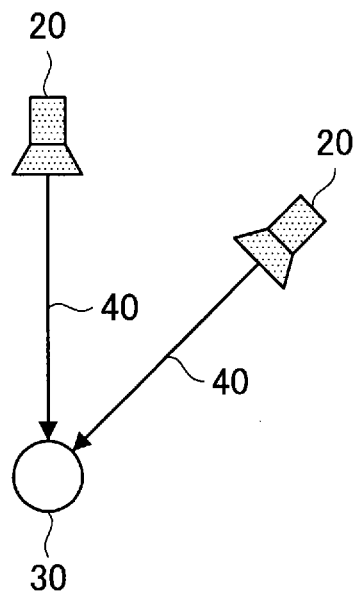
[Fig. 8]
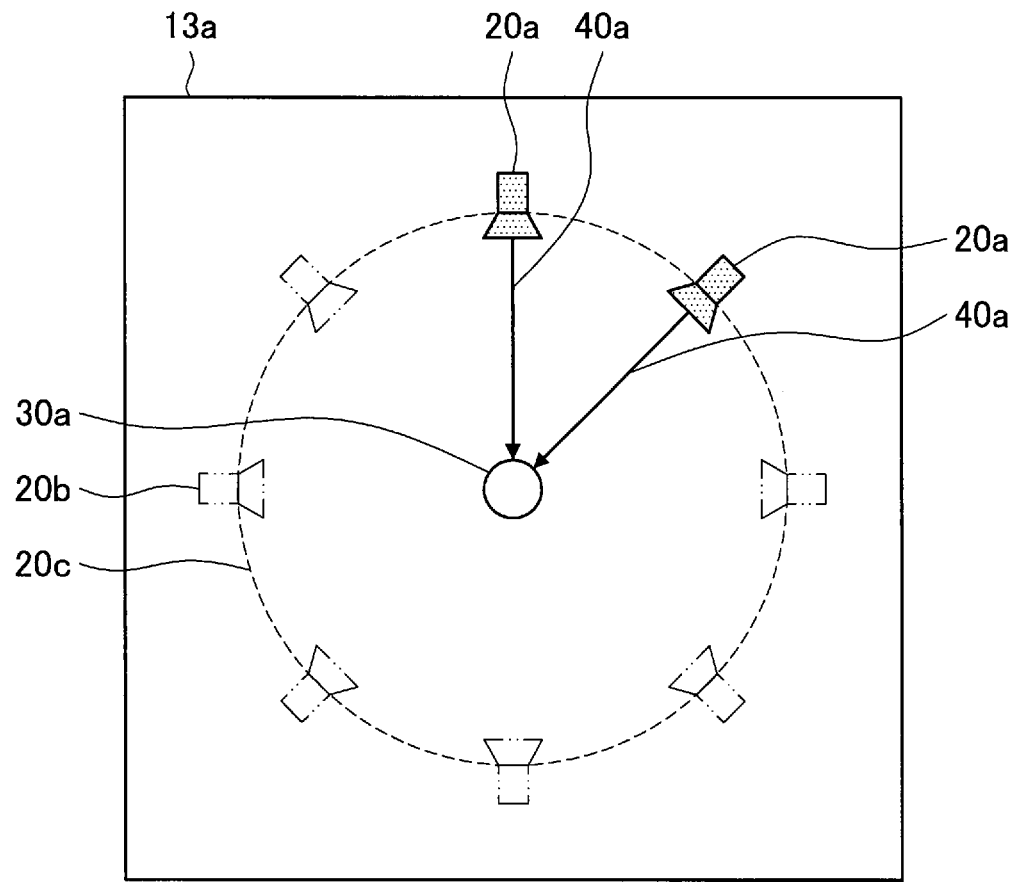

[Fig. 9]
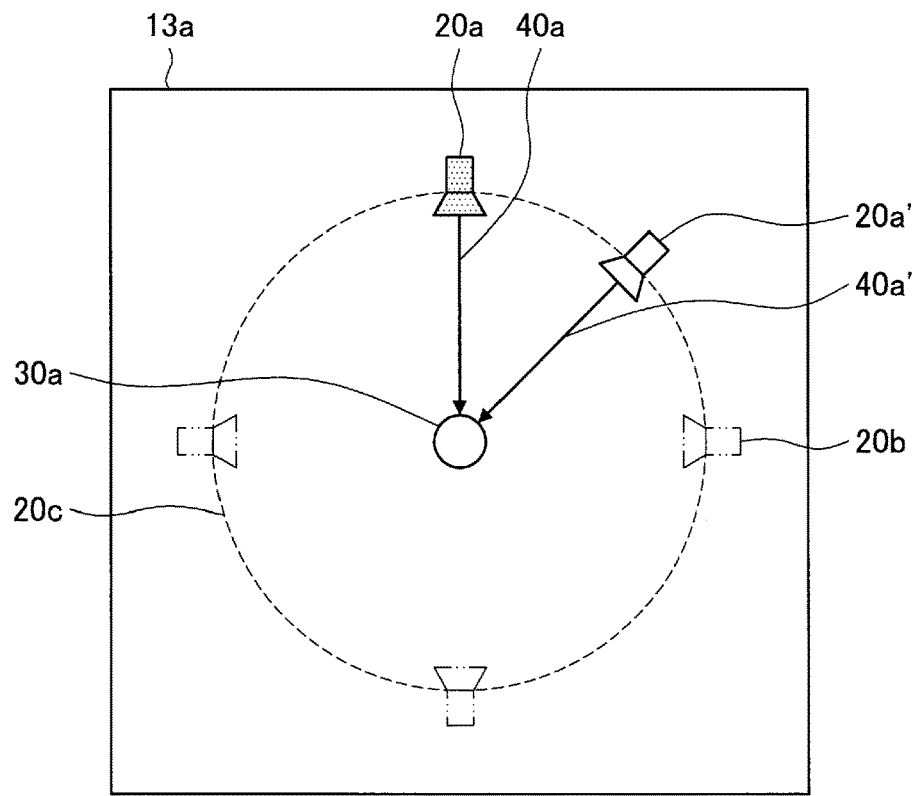
[Fig. 10]
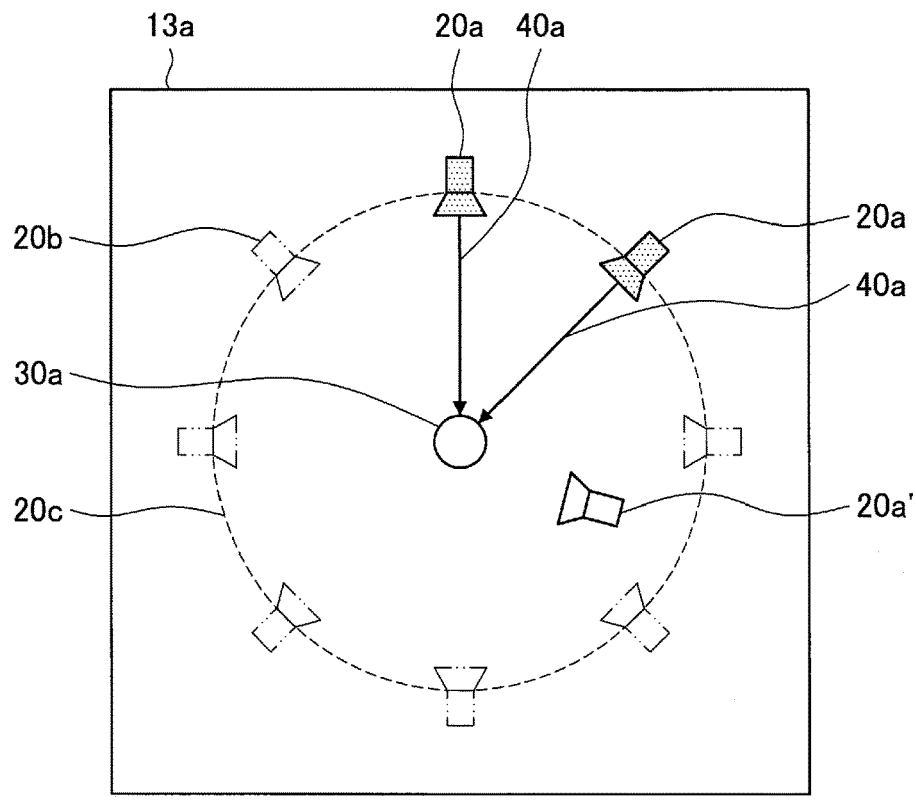

[Fig. 11]
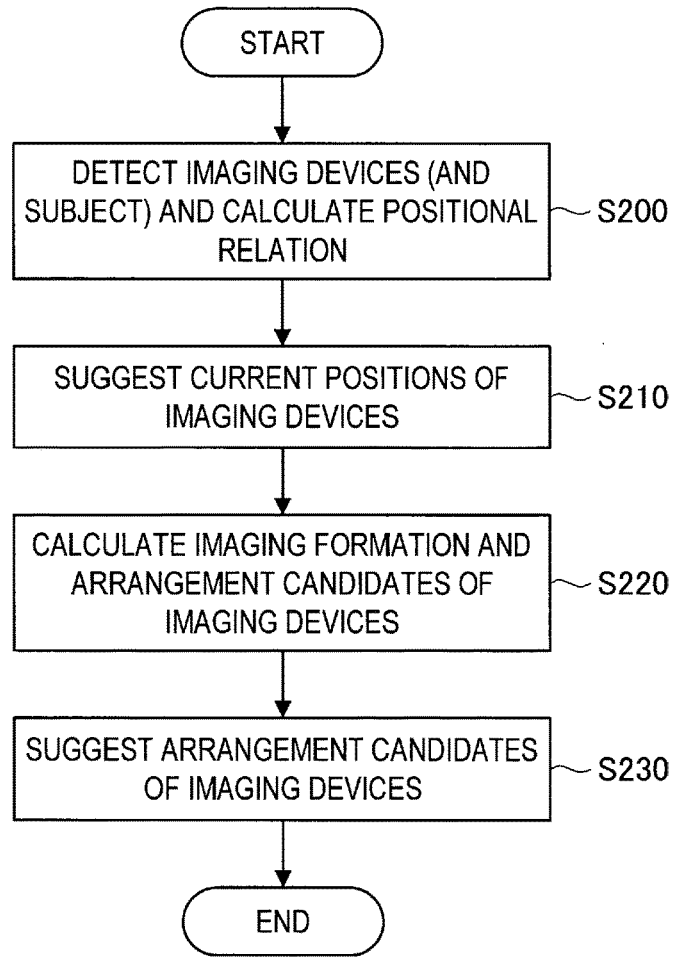
[Fig. 12]
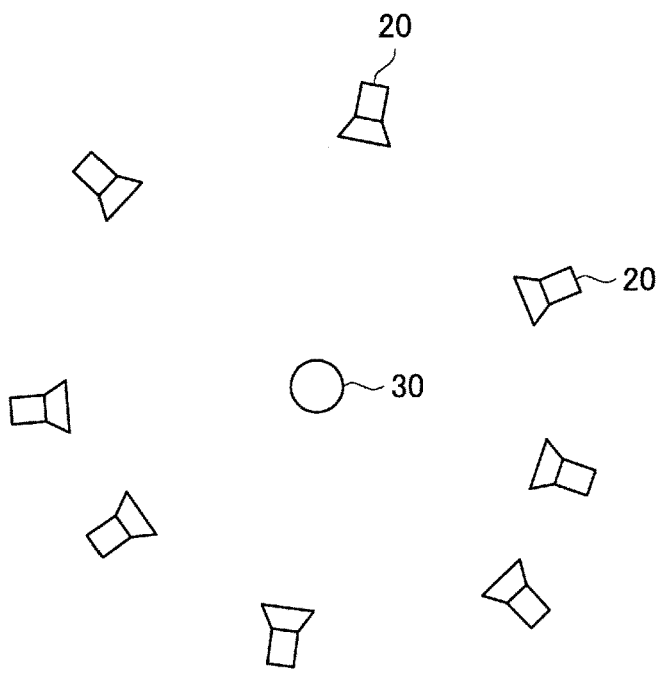

[Fig. 13]
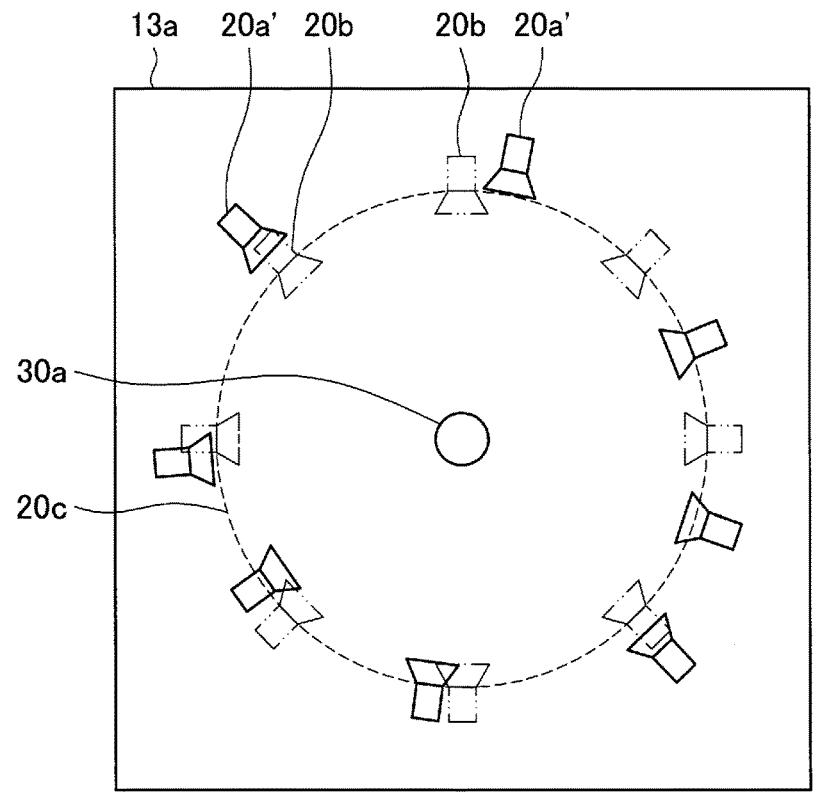
[Fig. 14]
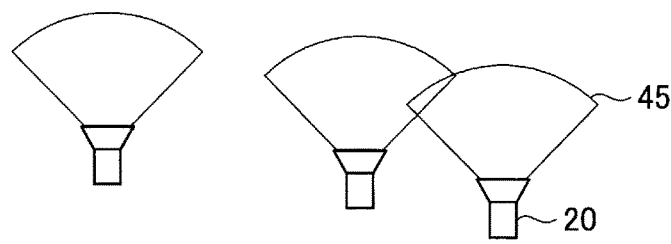
[Fig. 15]
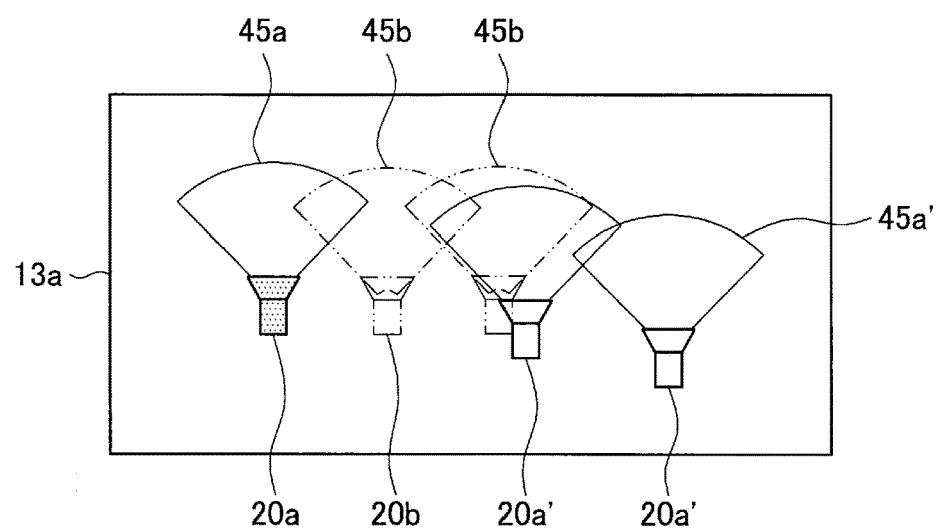

[Fig. 16]
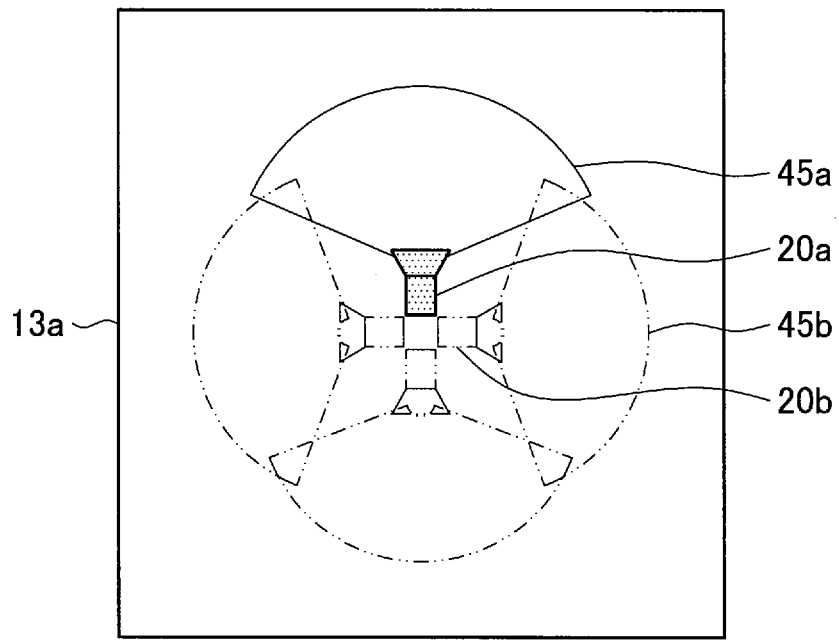
[Fig. 17]
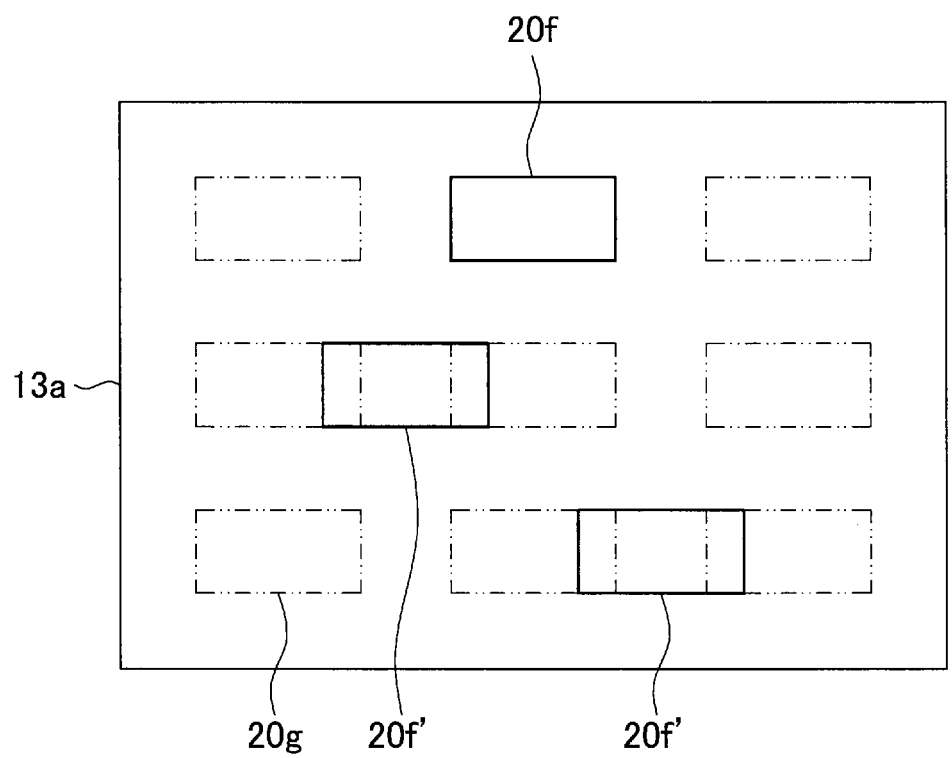

[Fig. 18]
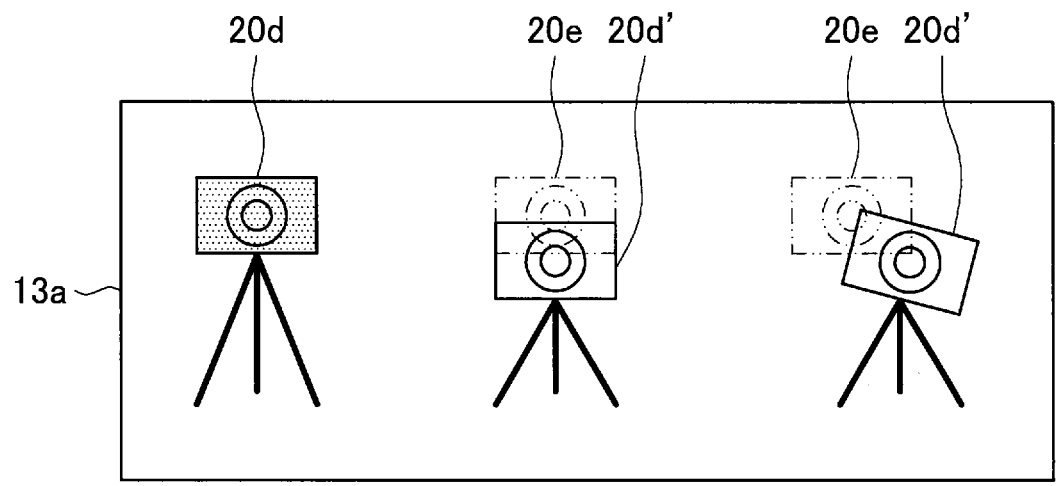
[Fig. 19]
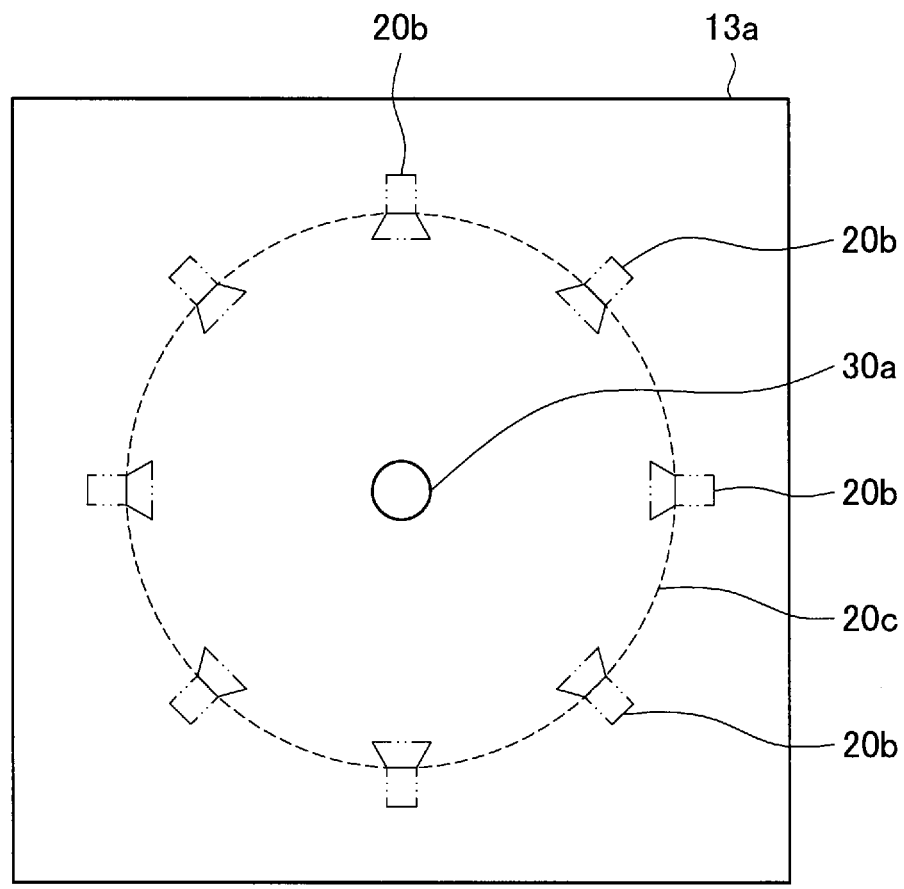

[Fig. 20]
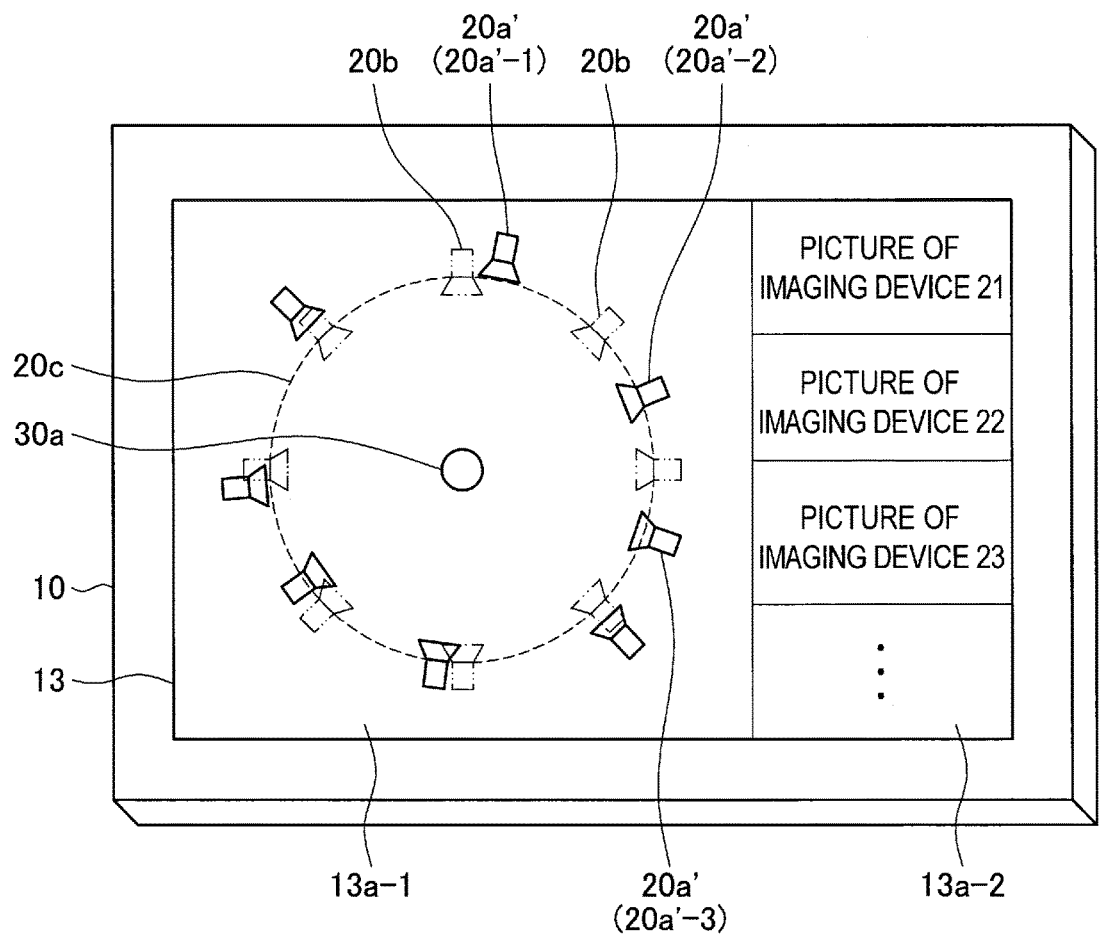

[Fig. 21]
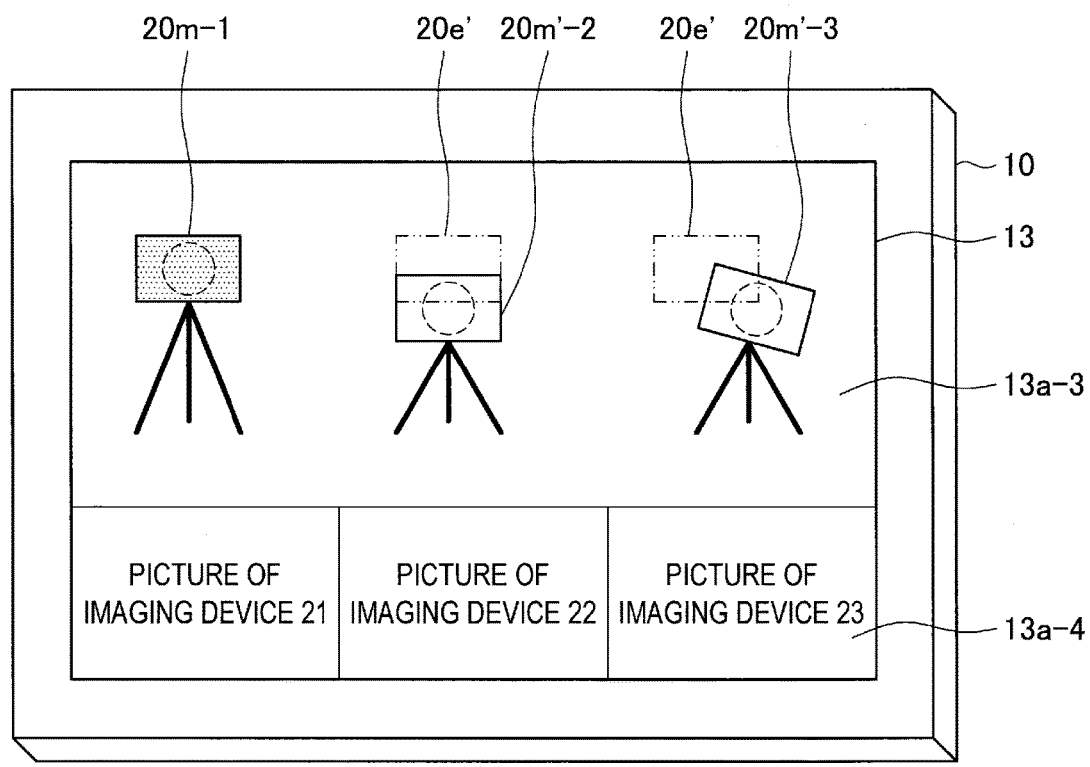
[Fig. 22]
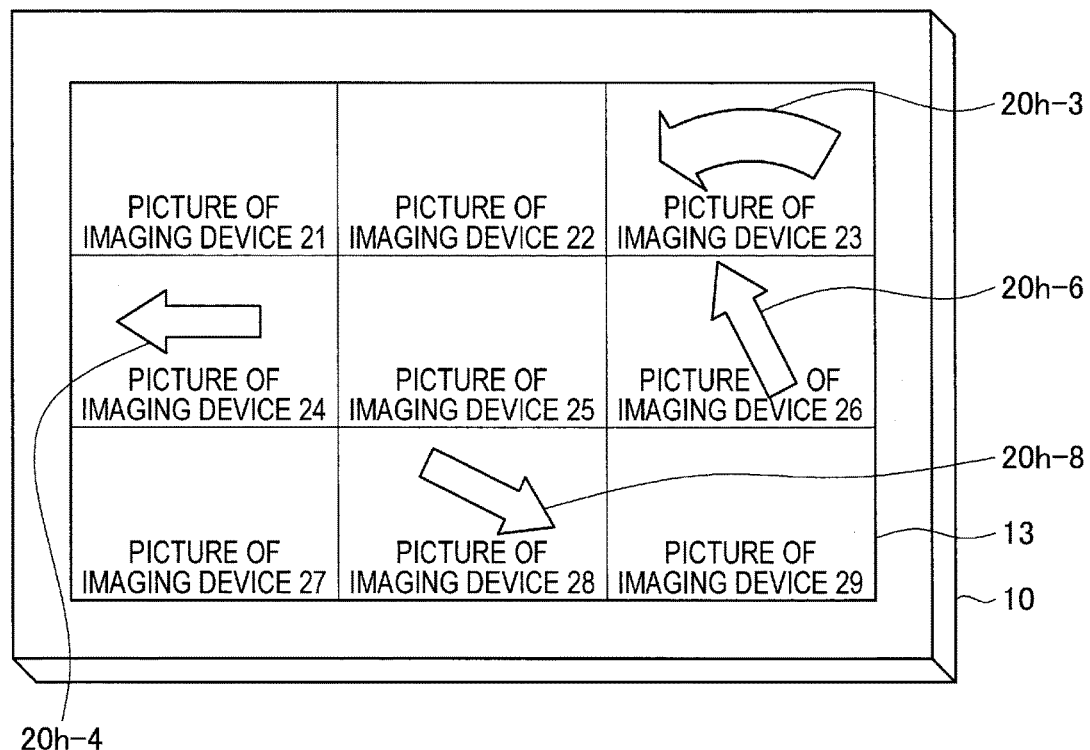

[Fig. 23]
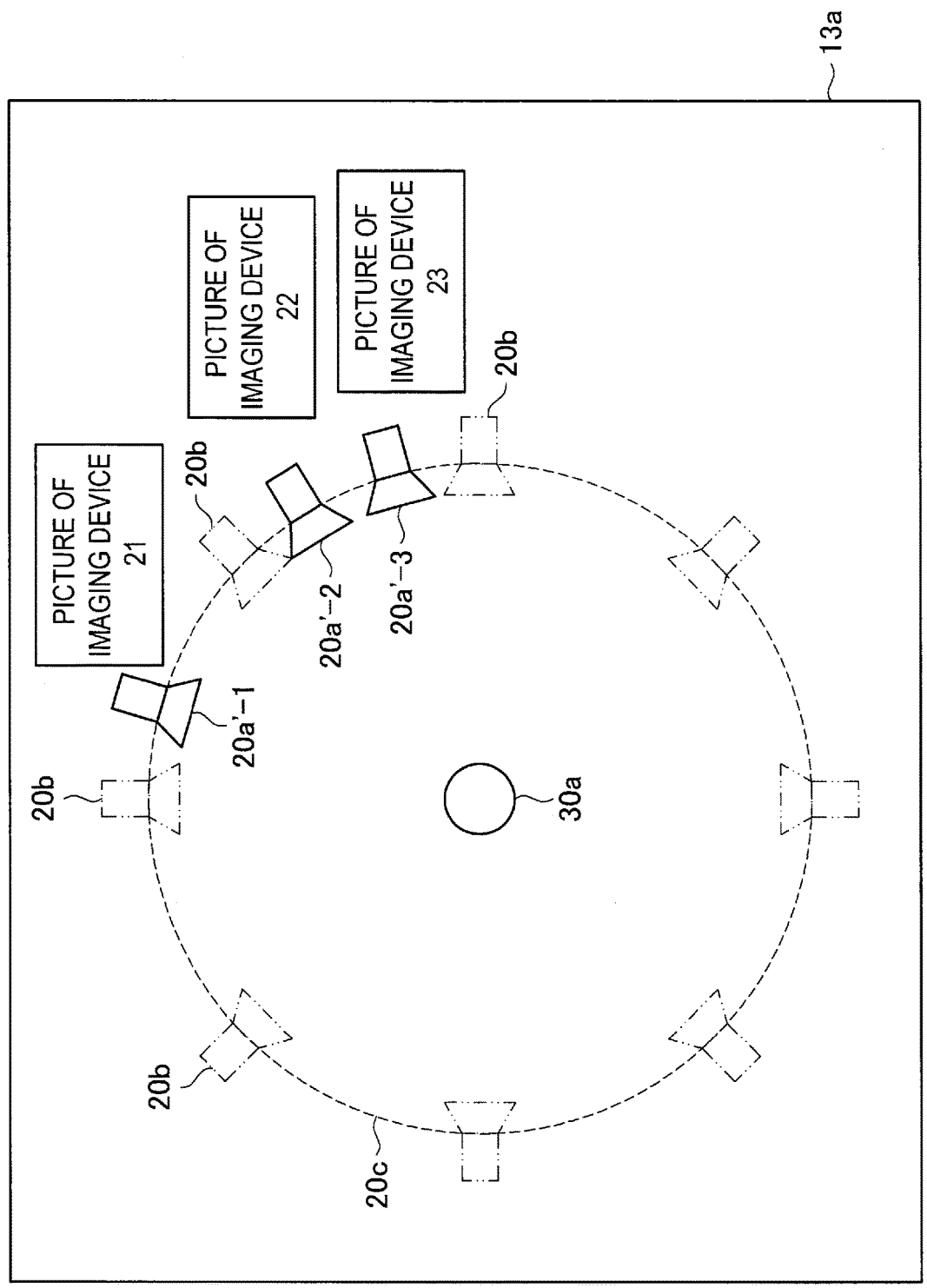

[Fig. 24]
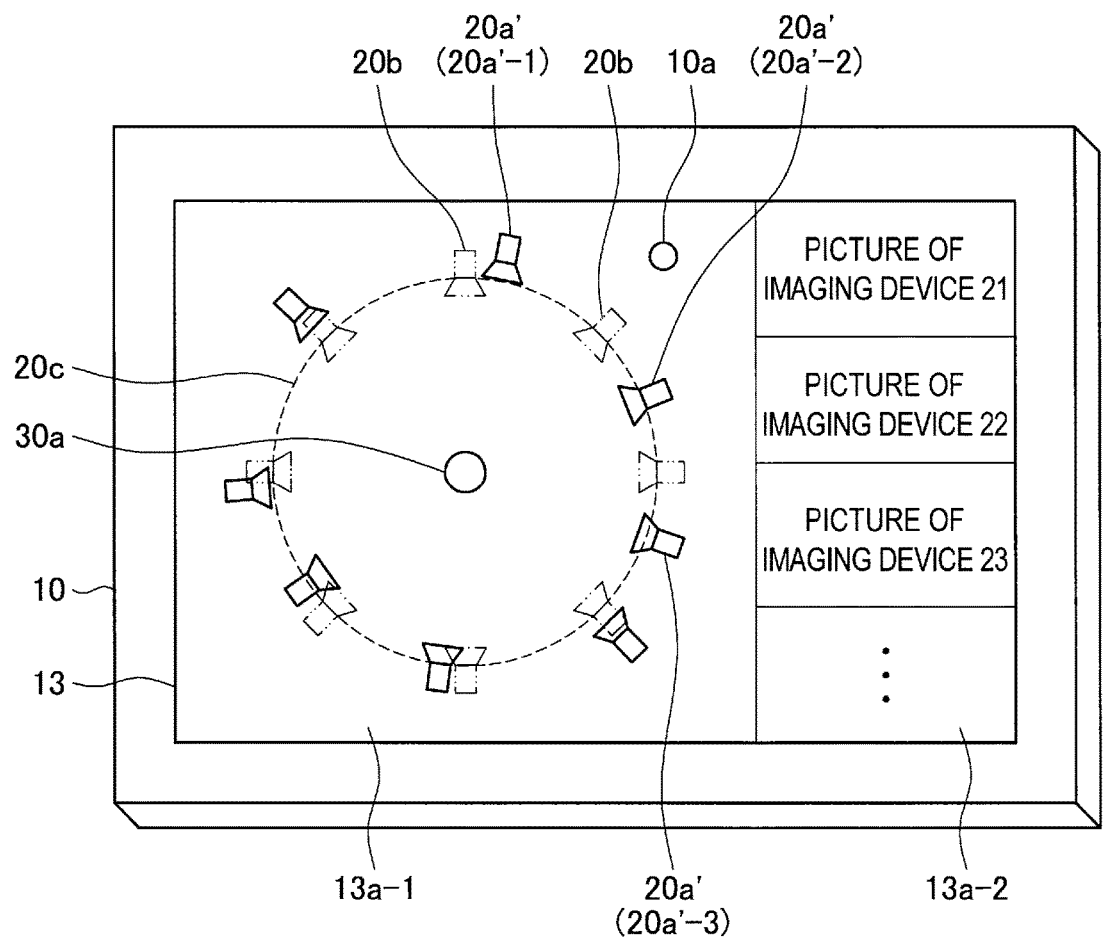

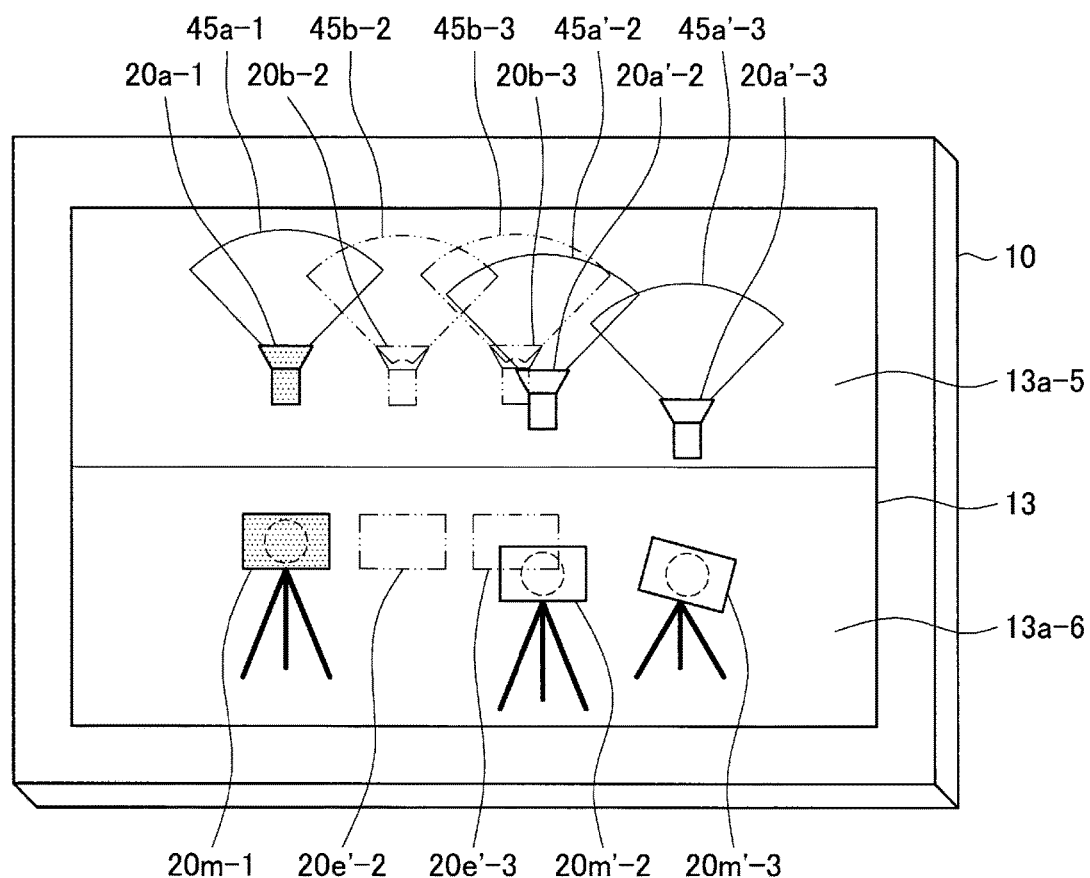
[Fig. 25]

[Fig. 26]
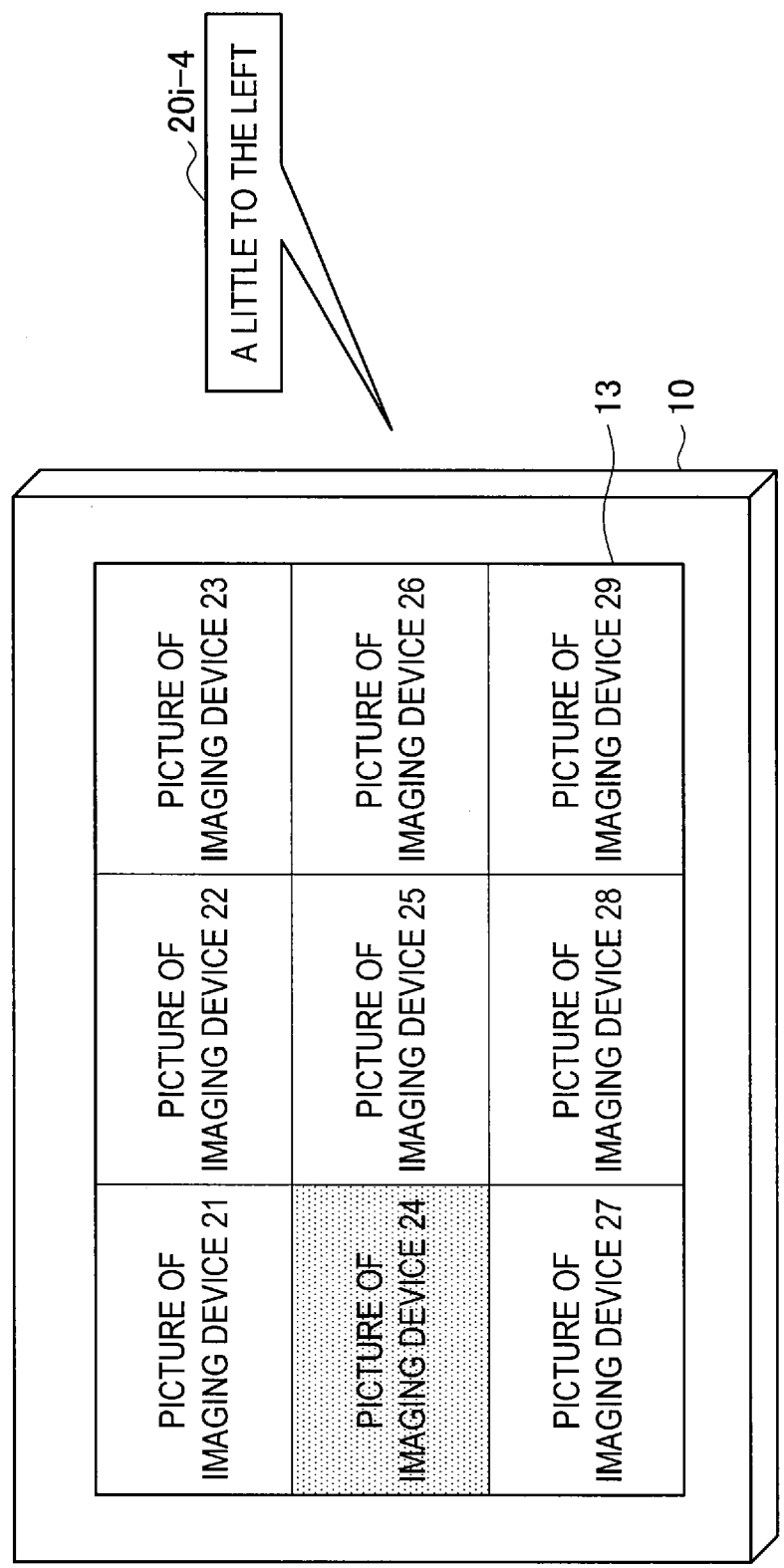

[Fig. 27]
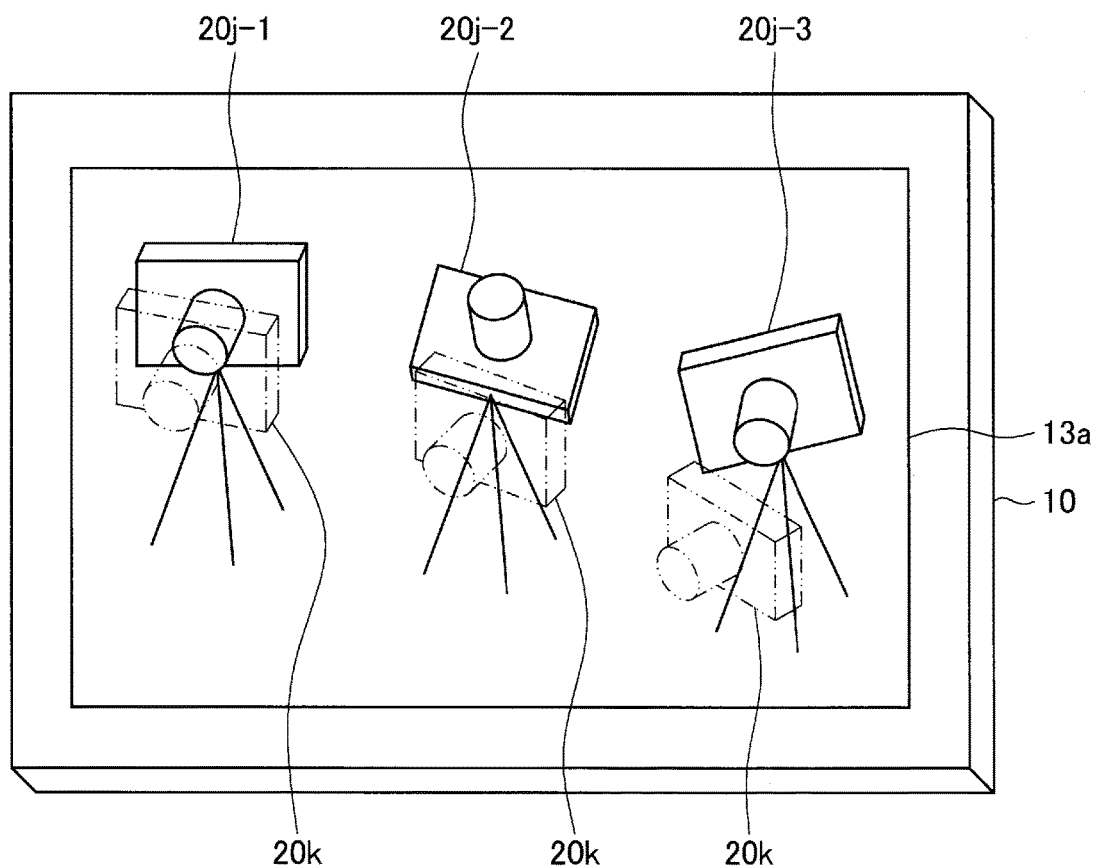

[Fig. 28]
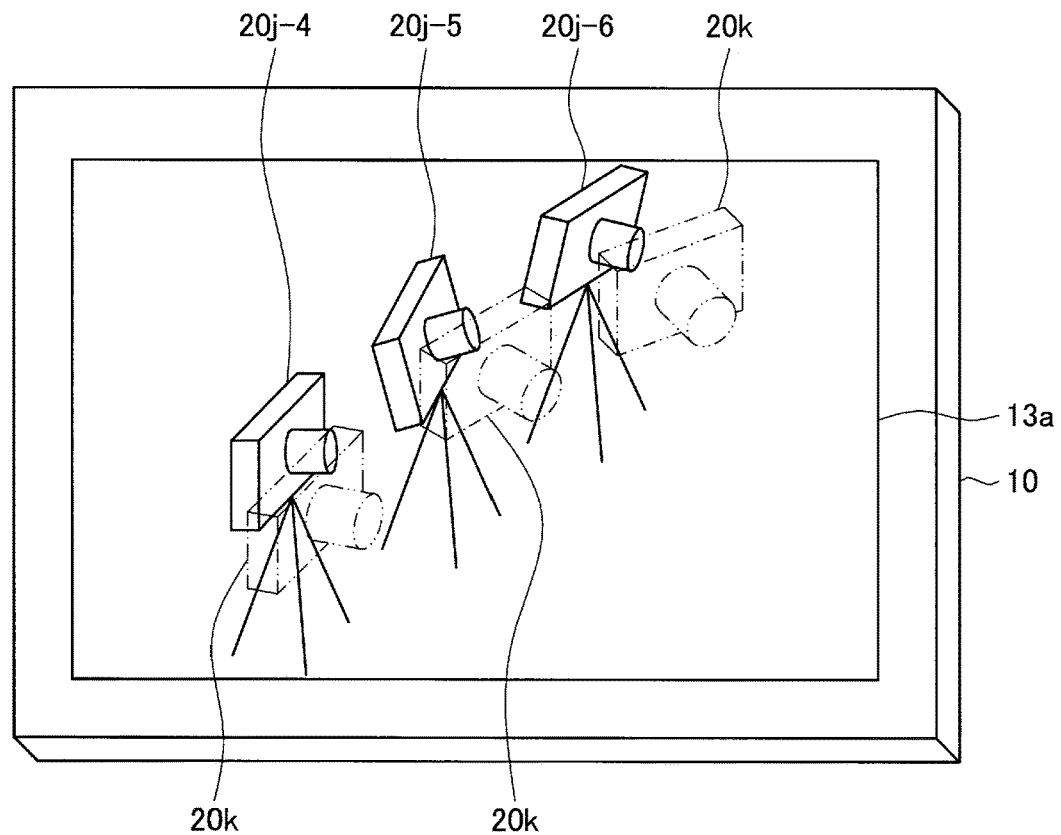
[Fig. 29]
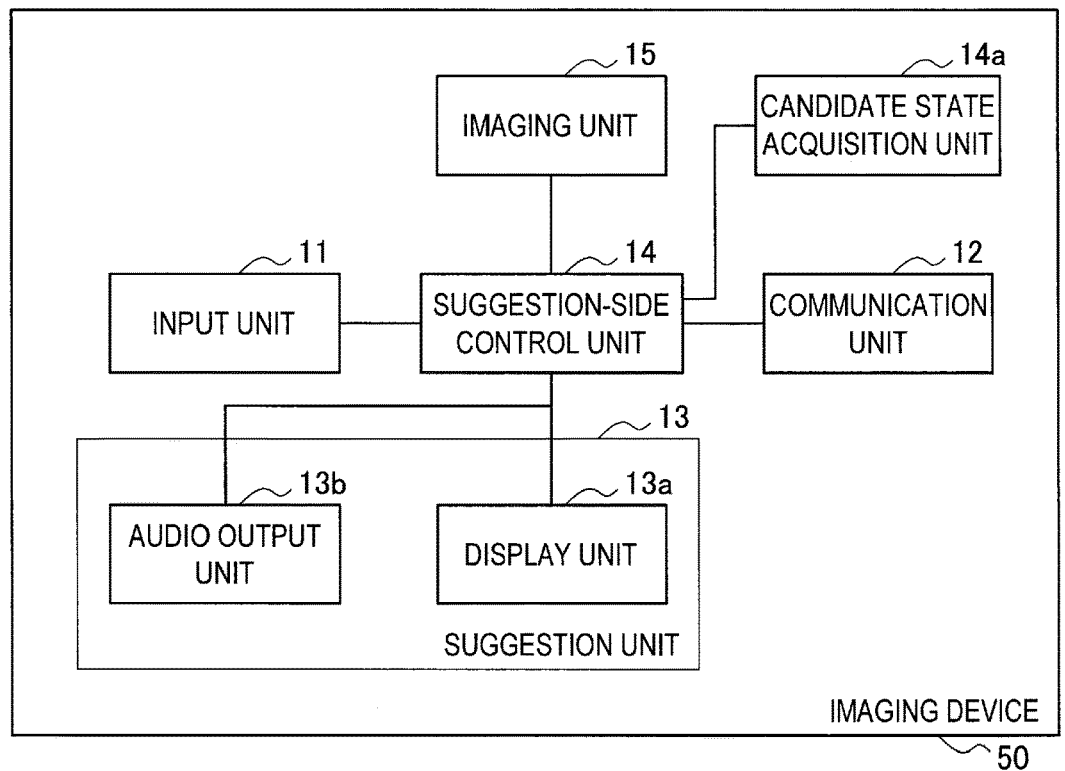

[Fig. 30]
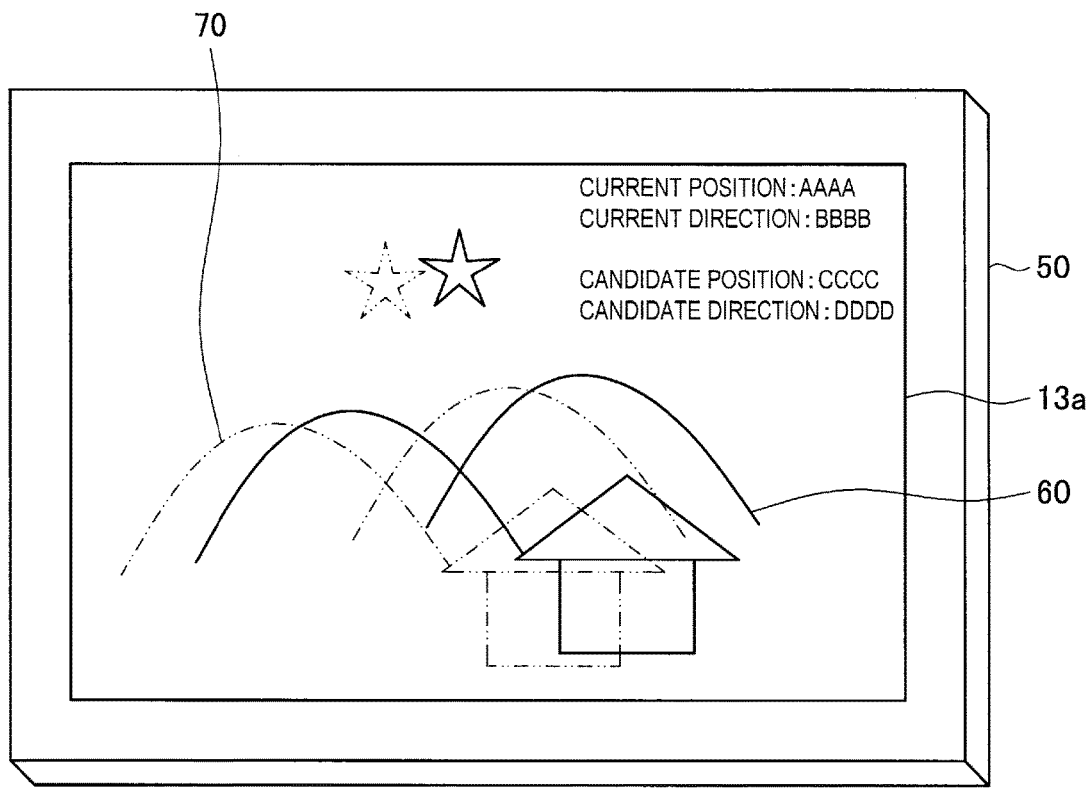

INFORMATION PROCESSING DEVICE, IMAGING DEVICE, INFORMATION PROCESSING METHOD, AND PROGRAM

CROSS REFERENCE TO RELATED APPLICATIONS

This application claims the benefit of Japanese Priority Patent Application JP 2013-122989 filed Jun. 11, 2013, the entire contents of which are incorporated herein by reference.

TECHNICAL FIELD

The present disclosure relates to an information processing device, an imaging device, an information processing method, and a program.

BACKGROUND ART

According to a technology disclosed in PTL 1, one captured image captured by one imaging device is displayed on a display unit of the one imaging device in contrast to other captured images captured by other imaging devices. According to this technology, a user of the one imaging device can adjust the installation position of the one imaging device such that some of the captured images are superimposed on each other.

CITATION LIST

Patent Literature

PTL 1: JP 2011-172093A

SUMMARY

Technical Problem

In this technology, however, since the captured image is displayed merely contrasting with the other captured images, it takes considerable time for the user to install a plurality of imaging devices. For this reason, there is a demand for a technology for suggesting candidates for installation states of a plurality of imaging devices.

Solution to Problem

According to an embodiment of the present disclosure, there is provided a system that suggests candidate installation states corresponding to each of a plurality of imaging devices based on a relationship between current installation states of each of the plurality of imaging devices; and outputs a suggested candidate installation state corresponding to at least one of the plurality of imaging devices based on the current installation state of each of the plurality of imaging devices and the determined candidate installation states.

The installation state may correspond to at least one of a position and installation posture of each of the plurality of imaging devices.

The installation posture may correspond to a direction of an optical axis of an imaging surface of each of the plurality of imaging devices and a rotation angle of each of the plurality of imaging devices relative to the optical axis.

According to another embodiment of the present disclosure, there is provided a non-transitory computer-readable medium including computer program instructions, which when executed by a system, cause the system to: suggest candidate installation states corresponding to each of a plurality of imaging devices based on a relationship between current installation states of each of the plurality of imaging devices; and output a suggested candidate installation state corresponding to at least one of the plurality of imaging devices based on the current installation state of each of the plurality of imaging devices and the determined candidate installation states.

According to another embodiment of the present disclosure, there is provided a method comprising: suggest, by circuitry, candidate installation states corresponding to each of a plurality of imaging devices based on a relationship between current installation states of each of the plurality of imaging devices; and outputting, by the circuitry, a suggested candidate installation state corresponding to at least one of the plurality of imaging devices based on the current installation state of each of the plurality of imaging devices and the determined candidate installation states.

Advantageous Effects of Invention

According to an embodiment of the present disclosure described above, since the candidate states which are candidates for the installation states of the plurality of imaging devices are suggested, a user can easily understand the candidate states of the imaging devices.

BRIEF DESCRIPTION OF DRAWINGS

FIG. 1 is a functional block diagram illustrating an information processing device according to a first embodiment of the present disclosure.

FIG. 2 is a diagram illustrating a hardware configuration of the information processing device according to the first embodiment.

FIG. 3 is a functional block diagram illustrating an imaging device.

FIG. 4 is a diagram illustrating a hardware configuration of the imaging device.

FIG. 5 is a flowchart illustrating the overview of a process performed by the information processing device.

FIG. 6 is a flowchart illustrating an example of the process performed by the information processing device.

FIG. 7 is a plan view illustrating an example of installation positions of imaging devices.

FIG. 8 is an explanatory diagram illustrating an example of an image displayed by the information processing device.

FIG. 9 is an explanatory diagram illustrating an example of an image displayed by the information processing device.

FIG. 10 is an explanatory diagram illustrating an example of an image displayed by the information processing device.

FIG. 11 is a flowchart illustrating an example of the process performed by the information processing device.

FIG. 12 is a plan view illustrating an example of installation positions of imaging devices.

FIG. 13 is an explanatory diagram illustrating an example of an image displayed by the information processing device.

FIG. 14 is a plan view illustrating an example of installation positions of imaging devices.

FIG. 15 is an explanatory diagram illustrating an example of an image displayed by the information processing device.

FIG. 16 is an explanatory diagram illustrating an example of an image displayed by the information processing device.

FIG. 17 is an explanatory diagram illustrating an example of an image displayed by the information processing device.

FIG. 18 is an explanatory diagram illustrating an example of an image displayed by the information processing device.

FIG. 19 is an explanatory diagram illustrating an example of an image displayed by the information processing device.

FIG. 20 is an explanatory diagram illustrating an example of an image displayed by the information processing device.

FIG. 21 is an explanatory diagram illustrating an example of an image displayed by the information processing device.

FIG. 22 is an explanatory diagram illustrating an example of an image displayed by the information processing device.

FIG. 23 is an explanatory diagram illustrating an example of an image displayed by the information processing device.

FIG. 24 is an explanatory diagram illustrating an example of an image displayed by the information processing device.

FIG. 25 is an explanatory diagram illustrating an example of an image displayed by the information processing device.

FIG. 26 is an explanatory diagram illustrating an example of an image displayed by the information processing device.

FIG. 27 is an explanatory diagram illustrating an example of an image displayed by the information processing device.

FIG. 28 is an explanatory diagram illustrating an example of an image displayed by the information processing device.

FIG. 29 is a functional block diagram illustrating an information processing device according to a second embodiment of the present disclosure.

FIG. 30 is an explanatory diagram illustrating an example of an image displayed by the information processing device.

DESCRIPTION OF EMBODIMENTS

Hereinafter, preferred embodiments of the present disclosure will be described in detail with reference to the appended drawings. Through this specification and the drawings, the same reference numerals are given to constituent elements having substantially the same functional configurations and repeated description will be omitted.

Also, the description will be made in the following order.
1. Review of technology of related art
2. First embodiment (example in which information processing device does not participate in imaging)
  2-1. Configuration of information processing device
  2-2. Configuration of imaging device
  2-3. Overview of process performed by information processing device
  2-4. Example of process performed by information processing device
  2-5. Various display examples
3. Second embodiment (example in which information processing device participates in imaging)
  3-1. Configuration of imaging device
  3-2. Example of process performed by imaging Device

1. Review of Technology of Related Art

The present inventors have conceived an information processing device and an imaging device according to the present embodiments by reviewing the technologies of the related art of the present disclosure. Accordingly, the technologies of the related art will first be described.

When a user performs photographing (imaging) in cooperation with a plurality of imaging devices (for example, cameras), it is necessary for the user to appropriately arrange the imaging devices. Here, examples of the photographing performed in cooperation with a plurality of imaging devices include panorama imaging and multi-viewpoint imaging. When a user performs the panorama imaging using a plurality of imaging devices, the user has to adjust installation positions and installation postures of the imaging devices to overlap captured images (pictures) obtained by the imaging devices. Here, the installation position of the imaging device is, for example, 3-dimensional coordinates of a central point of the imaging device. The installation posture of the imaging device is, for example, the direction of an optical axis of an imaging surface and a rotational angle of the imaging device when the optical axis is a rotational axis. For example, the direction of the optical axis is expressed as a vector oriented horizontally to the optical axis and oriented from an image sensor to the center of a lens. The rotational angle of the imaging device is assumed to be 0 degrees, for example, when the imaging device is maintained horizontally.

Also, in the multi-viewpoint imaging, each captured image is easily processed through an image combining process on a rear stage in many cases when imaging devices are installed at the same interval. Further, in either the panorama imaging or the multi-viewpoint imaging, imaging devices are preferably installed horizontally without inclination in some cases. Accordingly, it is necessary for the user to appropriately adjust the installation positions and the installation postures of the imaging devices in advance and then to perform photographing.

As a method of adjusting the installation positions and the installation postures of the imaging devices, a method of displaying captured images on a display unit of each imaging device and adjusting the installation positions and the installation postures of the imaging devices while contrasting the captured images one another can be exemplified. However, it takes much time and effort to perform this method. Further, in this method, one captured image does not overlap with other captured images (that is, is collapsed) in some cases when a panorama image is generated using the captured images. A user allows this captured image to be consistent with other captured images by performing an operation of editing the ruptured captured image in some cases. For example, when a captured image is ruptured due to inclination of an imaging device, the user can allow this captured image to be consistent with other captured images by rotating the captured image in some cases. However, it is necessary for the user to perform a separate operation such as an editing operation. Also, when the ruptured captured image is not consistent with the other captured images even through the editing operation, it is necessary for the user to perform the photographing again. Also, when the imaging device does not include a display unit, this method may not be adopted. For example, a small-sized camera or the like mounted on the body (for example, a head) of the user can be exemplified as the imaging device that does not include a display unit.

In the technology disclosed in PTL 1, a display unit of one imaging device displays one captured image captured by the one imaging device so that the one captured image is contrasted to other captured images captured by other imaging devices. According to this technology, a user of the one imaging device can adjust the installation position and the installation posture of the one imaging device so that some of the captured images overlap with each other.

However, the user still has to adjust the installation position and the installation posture of each imaging device while contrasting the captured images of the imaging devices. Further, this technology is realized when the number of imaging devices is relatively small (for example, two). However, when the number of imaging devices is large, it is difficult to realize this technology. This is because it is difficult to simultaneously display many imaging images on the display unit of the imaging device since the size of the display unit of the imaging device is restricted. Furthermore, an object of this technology is to allow a user to overlap some of the captured images. That is, this technology can be applied to an imaging process of overlapping some of the captured images. However, for example, in a method of multi-viewpoint imaging, there is also a method of not overlapping captured images. An image corresponding to a viewpoint at which imaging is not performed, that is, an interpolated image, is produced based on a captured image captured at a viewpoint close to this viewpoint. Accordingly, the technology of PTL 1 is not applicable to this type of multi-viewpoint imaging.

As described above, it takes much time and effort for a user to adjust installation positions and installation postures of imaging devices. Also, according to a work level, there are cases in which a plurality of imaging devices are installed at specific installation positions and installation postures in advance, as in imaging devices installed in, for example, sports equipment. However, this technology is applicable only when a specific scene can be photographed at a specific place (for example, a game at a sports posture is photographed. For this reason, it takes much time and effort for the user to adjust the installation positions and the installation postures of the imaging devices. Accordingly, there is a demand for a technology for suggesting candidates for installation states of a plurality of imaging devices. Here, the installation state is a concept including at least one of the installation position and the installation posture of the imaging device.

2. First Embodiment (Example in which Information Processing Device 10 does not Participate in Imaging)

Next, a first embodiment of the present disclosure will be described. In the first embodiment, an information processing device 10 does not participate in imaging. That is, the information processing device 10 performs suggestion of candidate states or the like of imaging devices 20.

(2-1. Configuration of Information Processing Device)

First, the configuration of the information processing device 10 will be described with reference to FIGS. 1 and 2. As illustrated in FIG. 1, the information processing device 10 includes an input unit 11, a communication unit 12, a suggestion unit 13, a candidate state acquisition unit (acquisition unit) 14a, and a suggestion-side control unit (control unit) 14. The information processing device 10 may be a device (so-called mobile computer) which a user can carry or may be a standing device. Examples of the device which a user can carry include a smartphone, a smart tablet, a wearable device (for example, a device in which an electronic device is mounted on goggles), and a note-type PC. An example of the standing device includes a desk-top PC. The information processing device 10 is preferably a device which a user can carry. This is because the user can understand more diverse places as candidates for installation states of imaging devices 20 (see FIG. 3) in this case. The information processing device 10 may include an imaging unit.

The input unit 11 receives an input operation from a user and outputs operation information to the suggestion-side control unit 14 in response to the input operation. The communication unit 12 performs communication with each imaging device 20. The communication unit 12 may perform communication with other communication devices other than the imaging device 20. The communication unit 12 outputs information obtainable through the communication to the suggestion-side control unit 14. The suggestion unit 13 suggests various kinds of information such as a current installation state of each imaging device 20 and candidates (that is, candidate states) of the installation state of each imaging device 20. The suggestion unit 13 is divided into a display unit 13a and an audio output unit 13b. The display unit 13a displays information and the audio output unit 13b outputs information in an audio manner. That is, the suggestion of the information is performed by at least one of, for example, screen display and audio output. The candidate state acquisition unit 14a detects (calculates) a current installation state of each imaging device and acquires (calculates and determines) a candidate state. The suggestion-side control unit 14 controls not only the entire information processing device 10 but also performs suggestion control or the like of various kinds of information. Also, the suggestion-side control unit 14 may acquire a candidate state. That is, the suggestion-side control unit 14 may have a function of the candidate state acquisition unit 14a.

Each function of the information processing device 10 is realized by a hardware configuration illustrated in, for example, FIG. 2. Of course, the hardware configuration is an example and any configuration may be realized as long as the configuration can realize each function of the information processing device 10.

As illustrated in FIG. 2, the information processing device 10 includes an input device 100, an output (suggestion) device 101, a CPU 102, a GPU 103, a communication device 104, a storage device 105, and a bus 106 as the hardware configuration. The input device 100 is a device configured to receive an input operation from a user and examples thereof include a touch panel, a mouse, and a keyboard. The output device 101 is a device configured to suggest various kinds of information and examples thereof include a display and a speaker. The CPU 102 reads a program stored in the storage device 105 and executes the program. The GPU 103, for example, generates and displays an image by reading a program stored in the storage device 105 and executing the program. The communication device 104 includes, for example, Wifi and NFC and performs communication with each imaging device 20 and another communication device. The storage device 105 stores a program that causes the information processing device 10 to realize the input unit 11, the communication unit 12, the suggestion unit 13, the candidate state acquisition unit (acquisition unit) 14a, and the suggestion-side control unit 14. Examples of the program include an object and audio recognition program, an imaging device position calculation program, an imaging device posture recognition program, and a user interface (UI) program. Also, other examples of the program include a program for synchronization of a plurality of pictures and synchronization of a plurality of audios, a photography mode decision program, an imaging device arrangement candidate calculation program, and an imaging device detection and communication program. Of course, the program is not limited thereto. The program may be acquired from another communication device via a communication network. The bus 106 electrically connects the hardware configuration.

(2-2. Configuration of Imaging Device)

Next, the configuration of the imaging device 20 will be described with reference to FIGS. 3 and 4. The imaging device 20 includes an imaging unit 31, a communication unit 32, a suggestion unit 33, a position detection unit 34, and an imaging-side control unit 35. The imaging device 20 is, for example, a camera, but an embodiment of the present disclosure is not limited thereto. Any device may be used as the imaging device 20 as long as the device has an imaging function. For example, the imaging device 20 may be a smartphone or a smart tablet having an imaging function. Also, the imaging device 20 may not include the suggestion unit 33 and the position detection unit 34.

The imaging unit 31 generates a captured image by performing imaging (photographing) and outputs the captured image to the imaging-side control unit 35. The communication unit 32 performs communication with the information processing device 10. The communication unit 32 may perform communication with other communication devices. The communication unit 32 outputs information obtainable through the communication to the imaging-side control unit 35. For example, the suggestion unit 33 suggests various kinds of information such as captured images and various audios. The suggestion of the information is performed, for example, through at least one of screen display and audio output. The position detection unit 34 generates sensor information used to calculate (detect) a current installation state of the imaging device 20 and outputs sensor information regarding the result to the imaging-side control unit 35. The imaging-side control unit 35 performs not only control of the entire imaging device 20 but also, for example, a process of transmitting the sensor information or the like in response to a request from the information processing device 10 to the information processing device 10.

Each function of the imaging device 20 is realized by a hardware configuration illustrated in, for example, FIG. 4. Of course, the hardware configuration is an example and any configuration may be realized as long as the configuration can realize each function of the imaging device 20.

As illustrated in FIG. 4, the imaging device 20 includes a lens 200, a lens driving circuit 201, an image sensor 202, an AFE circuit 203, an image processing circuit 204, a speaker driving circuit 205, a speaker 206, a display 207, and a communication circuit 208 as the hardware configuration. Also, the imaging device 20 includes a microphone 209, an audio processing circuit 210, a RAM 211, various sensors 212, a CPU 213, a GPU 214, media (storage media) 215, and a bus 216 as other units.

The lens 200 condenses light incident from the outside of the imaging device 20 on the image sensor 202. The lens driving circuit 201 adjusts the position of the lens 200. The image sensor 202 generates a captured image using the light from the lens 200. An analog front-end (AFE) circuit 203 converts the captured image generated by the image sensor 202 into digital information and outputs the digital information to the image processing circuit 204. The image processing circuit 204 performs various processes on the captured image. The speaker driving circuit 205 controls driving of the speaker 206. The speaker 206 outputs various audios. The display 207 displays various kinds of information such as a captured image. The communication circuit 208 includes, for example, Wifi and NFC and performs communication with the information processing device 10. The communication circuit 208 may perform communication with another communication device. The microphone 209 acquires an audio from a user or the like and outputs the audio as audio information to the audio processing circuit 210. Also, the audio information may be sensor information used to calculate a current installation state of the imaging device 20.

The audio processing circuit 210 performs various processes on the audio information. The RAM 211 is used as a working area of the CPU 213. The various sensors 212 include a sensor configured to generate sensor information used to calculate a current installation state of the imaging device 20. Specifically, the various sensors 212 include a ranging sensor, a GPS sensor, an infrared sensor, and a gyro sensor. Such sensor information can be provided to the CPU 213. The CPU 213 reads a program stored in the media or the like and executes the program. The GPU 214 generates and displays an image by reading a program stored in the media or the like and executing the program, as in the CPU 213. The media 215 are various recording media (a ROM, an external storage medium, and the like) and store, for example, a program that causes the imaging device 20 to realize the imaging unit 31, the communication unit 32, the suggestion unit 33, the position detection unit 34, and the imaging-side control unit 35. The bus 216 electrically connects the hardware configuration. In the following description, to distinguish the plurality of imaging devices 20 from each other, the imaging devices are referred to as imaging devices 21 to 29.

(2-3. Overview of Process Performed by Information Processing Device)

Next, the overview of a process performed by the information processing device 10 will be described with reference to the flowchart illustrated in FIG. 5. Also, in the following description, the suggestion-side control unit 14 acquires (calculates) a candidate state, but the candidate state acquisition unit 14a may acquire (calculate) the candidate state. In step S10, a user installs the single imaging device 20 or the plurality of imaging devices 20. The installation states (installation positions, installation postures, or the like) of the imaging devices 20 are preferably determined in consideration of an imaging formation to be described below, but may be determined in any manner.

Next, the information processing device 10 calculates current installation states of the imaging devices 20. Specifically, for example, the suggestion-side control unit 14 causes the communication unit 12 to transmit request information indicating a request to transmit sensor information to each imaging device 20. The communication unit 32 of each imaging device 20 outputs the request information to the imaging-side control unit 35. The imaging-side control unit 35 outputs the request information to the position detection unit 34, and then the position detection unit 34 outputs sensor information to the imaging-side control unit 35. The imaging-side control unit 35 causes the communication unit 32 to transmit the sensor information to the information processing device 10, and then the communication unit 12 of the information processing device 10 outputs the sensor information to the suggestion-side control unit 14. Also, when the installation states are concluded by the user, the imaging device 20 may transmit the sensor information to the information processing device 10. As a method of concluding the installation states, for example, a method of preparing an installation state conclusion button in the imaging device 20 and deciding that the installation states are concluded when the installation state conclusion button is pushed can be exemplified, but an embodiment of the present disclosure is not limited thereto. The suggestion-side control unit 14 may automatically conclude the installation states when the installation states of the imaging devices 20 are in accordance with the candidate states.

The suggestion-side control unit 14 calculates the current installation state of each imaging device 20 based on the sensor information provided from each imaging device 20 and finds the number of installed imaging devices 20. A specific calculation method based on each piece of sensor information is not particularly limited.

Also, the method of calculating the current installation state is not limited to this method. For example, when the plurality of imaging devices 20 are installed, the information processing device 10 may acquire captured images from the imaging devices 20 and calculate the current installation states of the imaging devices 20 based on parallax or the like between the captured images.

Also, the imaging device 20 which is a communication target with the information processing device 10 is not particularly limited as long as the imaging device 20 can communicate with the information processing device 10, but an embodiment of the present disclosure may be limited to some methods. For example, the information processing device 10 may detect the imaging devices 20 within a communicable range of the information processing devices 10, suggest a list of the imaging devices 20, and cause the user to select a desired imaging device 20 from the list of the imaging devices 20. Also, when the imaging devices 20 construct given networks, the suggestion-side control unit 14 may suggest a list of the networks and cause the user to select a desired network from the list of the networks. Also, identification information may be assigned to the imaging device 20 and the suggestion-side control unit 14 may be configured to communicate only with the imaging device 20 having the predetermined identification information.

In step S20, the information processing device 10 calculates candidates for the installation states of the imaging devices 20, that is, candidate states, (that is, acquires the candidate states) based on the current installation states of the imaging devices 20. A specific process is as follows. For example, the suggestion-side control unit 14 first determines an imaging formation (candidate formation). Here, the imaging formation refers to a formation when the imaging devices 20 perform imaging. Examples of the imaging formation include a 360-degree panorama imaging formation illustrated in FIG. 16 and a series-shaped multi-viewpoint imaging formation (formation in which the plurality of imaging devices 20 are arranged in series) illustrated in FIG. 15. Other examples of the imaging formation include a ring-shaped multi-viewpoint imaging formation (formation in which the plurality of imaging devices 20 are arranged to surround a subject) illustrated in FIG. 8 and a pile imaging formation illustrated in FIG. 17.

Captured images captured according to the multi-viewpoint imaging formation are used for, for example, a free-viewpoint display device, a 3D display device, a street view, and a 360-degree display device. Captured images captured according to the 360-degree panorama imaging formation are used, for example, to generate a panorama image or a time slice image.

For example, the suggestion-side control unit 14 may cause the user to select the imaging formation. When the suggestion-side control unit 14 causes the user to select the imaging formation, for example, the suggestion-side control unit 14 suggests a list of imaging formations to the suggestion unit 13. The user selects a desired imaging formation from the list.

On the other hand, the suggestion-side control unit 14 may determine the imaging formation based on the current installation states of the imaging devices 20. For example, when the optical axis of each imaging device 20 is oriented toward the outside with a given spot as a center, the suggestion-side control unit 14 determines the 360-degree panorama imaging formation as the imaging formation.

Also, when the imaging devices 20 are arranged in series and the optical axes of the imaging devices 20 are orthogonal to the row of the imaging devices 20, the suggestion-side control unit 14 determines the series-shaped multi-viewpoint imaging formation as the imaging formation. Also, when the imaging devices 20 surround a given subject and the optical axes of the imaging devices 20 orient the subject, the suggestion-side control unit 14 determines the ring-shaped multi-viewpoint imaging formation as the imaging formation.

Here, the suggestion-side control unit 14 determines a subject of the ring-shaped multi-viewpoint imaging formation as follows. For example, the suggestion-side control unit 14 determines a subject commonly depicted in captured images provided from the imaging devices 20 as the subject of the ring-shaped multi-viewpoint imaging formation. Of course, the subject determination method is not limited thereto. For example, since the user tends to install the preliminary imaging device 20 carefully, the suggestion-side control unit 14 may acquire a captured image from the initially installed imaging device 20 and select an object depicted at the center of the captured image as a subject.

Also, the suggestion-side control unit 14 may suggest a list of captured images to the suggestion unit 13 and may cause the user to select a subject. Also, the suggestion-side control unit 14 may determine a subject depicted at the center of one of the captured images as a subject of the multi-viewpoint imaging formation. Also, the suggestion-side control unit 14 may store an algorithm that determines a specific object (for example, a figure) as a subject and may determine a subject according to the algorithm. The suggestion-side control unit 14 may cause the side of the imaging device 20 to determine a subject. In this case, the imaging device 20 may determine the subject according to the same process as above.

Also, when the imaging devices 20 can be piled in the vertical direction, the suggestion-side control unit 14 determines the pile imaging formation as the imaging formation. Also, preset imaging formation may be selected as the imaging formation or any imaging formation may be generated based on the current installation states. For example, the suggestion-side control unit 14 may calculate an approximate curve passing through the current installation positions and may determine this approximate curve as the installation formation.

Subsequently, the suggestion-side control unit 14 determines the number of imaging devices 20 that constitute the imaging formation. The suggestion-side control unit 14 may cause the user to determine the number of imaging devices 20 or may determine the number of imaging devices 20 based on the current installation states and the imaging formation of the imaging devices 20.

For example, when the imaging formation is the ring-shaped multi-viewpoint imaging formation, the suggestion-side control unit 14 calculates a radius of the ring-shaped multi-viewpoint imaging formation based on the current installation states of the imaging devices 20. For example, the suggestion-side control unit 14 calculates distances between the respective imaging devices 20 and a subject and sets an average value of the distances as the radius of the ring-shaped multi-viewpoint imaging formation. Then, the suggestion-side control unit 14 may divide the circumference of the ring-shaped multi-viewpoint imaging formation by a distance between the adjacent imaging devices 20 and set a value obtained through the division as the number of imaging devices 20. When the imaging formation is the 360-degree panorama imaging formation, the suggestion-side control unit 14 may determine the number of imaging devices 20 according to the same method. Also, when the imaging formation is the series-shaped multi-viewpoint imaging formation, the suggestion-side control unit 14 may divide a preset distance by a distance between the adjacent imaging devices 20 and may set a value obtained through the division as the number of imaging devices 20. Also, the suggestion-side control unit 14 may set the number of imaging devices 20 for each imaging formation in advance. In particular, when the imaging formation is the ring-shaped multi-viewpoint imaging formation or the 360-degree panorama imaging formation, the suggestion-side control unit 14 may set the number of imaging devices 20 for each radius of the imaging formation. In this case, the suggestion-side control unit 14 may calculate a radius of the imaging formation according to the same method as above and determine the number of imaging devices 20 based on the calculation result.

Subsequently, the suggestion-side control unit 14 determines the candidate states of the imaging devices 20 based on the imaging formation and the number of imaging devices 20. Here, in the candidate states, the installation positions (hereinafter, also referred to as "candidate positions") of the imaging device 20 may be determined so that the imaging devices 20 are arranged at the same interval in the imaging formation. Of course, any interval may be used as the interval between the imaging devices 20. In this case, the interval between the imaging devices 20 may be determined by the user or may be determined based on angles of fields of the imaging devices 20 and the overlap state between the captured images. For example, the larger the angle of field of the imaging device 20 is, the larger the interval between this imaging device 20 and another imaging device 20 may be set to be. Also, a plurality of installation interval setting methods may be used or a priority can be associated with such determination criteria. For example, a setting method of setting installation intervals between the imaging devices 20 based on angles of field and a setting method of arranging the imaging devices 20 at the same interval may be prepared. Then, when the angle of field of the imaging device 20 is determined, a process of prioritizing the former setting method may be performed. Also, the setting method may be changed for each imaging formation.

On the other hand, in the candidate states, the postures (hereinafter, also referred to as "candidate postures") of the imaging devices 20 may be set as follows. For example, the directions of the optical axes may be determined such that the imaging devices 20 constitute an imaging formation. The rotational angle of the imaging device 20 may be basically 0 degrees (an angle at which the imaging device 20 is maintained horizontally), but another value may be used. For example, any rotational angle may be set by the user.

In step S30, the suggestion-side control unit 14 suggests the candidate states. The suggestion-side control unit 14 may display the current installation states along with the candidate states. Here, the candidate states and the current installation states can be suggested in various forms. The suggestion-side control unit 14 may display, for example, plane images (images obtainable by projecting the imaging devices 20 on a horizontal plane), front images, rear images, stereoscopic images (bird's-eye images of the imaging devices 20), and the like of the imaging device 20 according to the candidate states and the current installation states. Also, the suggestion-side control unit 14 may display the plane images and the like indicating the current installation states and the plane images and the like indicating the candidate states in other forms. Also, the suggestion-side control unit 14 may display the plane images and the like in accordance with the candidate states and the plane images and the like different from the candidate states among the plane images and the like indicating the current installation states in different forms. Also, the suggestion-side control unit 14 may suggest, for example, adjustment content (for example, an arrow or an audio indicating an adjustment direction) for coordinating the current installation states of the imaging devices 20 with the candidate states. Also, the suggestion-side control unit 14 may display images which are being captured by the imaging devices 20 in association with the current installation states and the candidate states. Also, since the angle of the field of each imaging device 20 becomes important in the multi-viewpoint imaging, the panorama imaging, and the like, the suggestion-side control unit 14 may suggest the angle of the field of each imaging device 20. In this case, each imaging device 20 may also transmit information regarding the angle of the field along with the above-described sensor information to the information processing device 10. Further, the information regarding the angle of the field may be stored in advance in the information processing device 10 or may be input to the information processing device 10 by the user. Thereafter, the information processing device 10 ends the present process.

Also, the suggestion-side control unit 14 may perform at least the process of step S30 or may cause another device, e.g., the imaging device 20 (for example, the imaging device 20 of which a CPU load is the smallest) or another communication device to perform another process and receive the result. That is, the suggestion-side control unit 14 may distribute the processes of steps S10 and S20 to different devices so that the devices can perform the processes. For example, a given imaging device 20 may calculate its own current installation state and the current installation state of an adjacent imaging device 20 and transmit the result to the information processing device 10.

Also, in the foregoing process, the candidate states corresponding to one imaging formation have been suggested, but candidate states of each of a plurality of imaging formations may be calculated and the candidate states may be suggested such that the candidate states can be distinguished from each other (for example, color coding display or luminance change display). Through the foregoing process, the user can understand the candidate states easily and interactively even when the user does not understand the candidate states beforehand. As a result, since the user can contrast the current installation states and the candidate states, the user can easily coordinate the installation states of the imaging devices 20 with the candidate states. In addition, each imaging device 20 in the candidate state can capture a captured image with higher consistency. Accordingly, the information processing device 10 can reduce a burden of subsequent processes (an editing operation and the like) on the user.

(2-4. Example of Process Performed by Information Processing Device)

Hereinafter, a specific example of the process performed by the information processing device 10 will be further described. However, the process performed by the information processing device 10 is, of course, not limited to the following example.

Also, in the following example, the information processing device 10 is a device (for example, a smartphone or a smart tablet) that the user can carry, but another information processing device 10 can perform the following process.

(2-4-1. Example of Process of Suggesting Ring-Shaped Multi-Viewpoint Imaging Formation)

As an example of the process performed by the information processing device 10, first, a process of suggesting a ring-shaped multi-viewpoint imaging formation will be described with reference to the flowchart of FIG. 6.

In step S100, the user installs M (where M is 1 or an integer equal to or greater than 2) imaging devices 20 and turns on power switches thereof. The installation states of the imaging devices 20 are preferably determined in consideration of the ring-shaped multi-viewpoint imaging formation, but may be determined in consideration of any formation. An example of the installation states is illustrated in FIG. 7. In this example, two imaging devices 20 are installed around an object 30 and all of the optical axes 40 of the imaging devices 20 are oriented toward the object 30. Also, the distances between the object 30 and the respective imaging devices 20 are substantially the same.

Next, the information processing device 10 detects the installed imaging devices 20 and calculates the current installation states of the imaging devices 20. Specifically, for example, the suggestion-side control unit 14 causes the communication unit 12 to transmit request information indicating a request for the sensor information to each imaging device 20. In response to the request information, each imaging device 20 transmits the sensor information to the information processing device 10, and then the communication unit 12 of the information processing device 10 outputs the sensor information to the suggestion-side control unit 14. The imaging devices 20 may transmit the sensor information to the information processing device 10 when the installation states are concluded by the user.

The suggestion-side control unit 14 detects the installed imaging devices 20 based on the sensor information given from each imaging device 20. Then, the suggestion-side control unit 14 calculates the current installation states (positional relation) of the imaging devices 20 and finds the number of installed imaging devices 20. A specific calculation method based on each piece of sensor information is not particularly limited.

Also, a method of calculating the current installation states is not limited to this method. For example, as illustrated in FIG. 7, when a plurality of imaging devices 20 are installed, the information processing device 10 may acquire captured images from the imaging devices 20 and calculate the current installation states of the imaging devices 20 based on parallax or the like between the captured images.

Further, the imaging device 20 determines a subject of the ring-shaped multi-viewpoint imaging formation. For example, the suggestion-side control unit 14 determines a subject commonly depicted in the captured images given from the imaging devices 20 as a subject of the ring-shaped multi-viewpoint imaging formation. For example, in the case illustrated in FIG. 7, since the object 30 is commonly depicted in the captured images given from the imaging devices 20, the suggestion-side control unit 14 can determine the object 30 as the subject. Of course, a method of determining a subject is not limited thereto. The specific contents of the other determination methods have been described above.

Subsequently the suggestion-side control unit 14 suggests the current installation states of the imaging devices 20. Specifically, the suggestion-side control unit 14 generates a plurality of plane images of the imaging devices 20 and displays the plane images on the display unit 13a in forms according to the current installation states, that is, at the display positions according to the current installation positions and display postures according to the current installation postures. Here, the display posture is a concept including an optical axis direction and a rotational angle of the plane image. That is, the display position of the plane image corresponds to the current installation position, and the optical axis direction and the rotational angle of the plane image correspond to the current installation posture. Further, the suggestion-side control unit 14 also displays a subject image indicating a subject.

Subsequently, the suggestion-side control unit 14 determines the ring-shaped multi-viewpoint imaging formation as the imaging formation based on the current installation states of the imaging devices 20. For example, as illustrated in FIG. 7, the suggestion-side control unit 14 determines the ring-shaped multi-viewpoint imaging formation as the imaging formation when the imaging devices 20 surround the object 30 and the optical axes of the imaging devices 20 are oriented toward the object 30. Also, the suggestion-side control unit 14 may suggest a list of the imaging formations to the suggestion unit 13 so that the user can select the ring-shaped multi-viewpoint imaging formation.

Further, the suggestion-side control unit 14 determines N (where N>M) which is the number of imaging devices 20 that constitute the ring-shaped multi-viewpoint imaging formation. The suggestion-side control unit 14 may cause the user to determine N which is the number of imaging devices or may determine the number of imaging devices based on the current installation states of the imaging devices 20 and the imaging formation.

For example, the suggestion-side control unit 14 calculates the radius of the ring-shaped multi-viewpoint imaging formation based on the current installation states of the imaging devices 20. For example, the suggestion-side control unit 14 calculates distances between the subject and the respective imaging device 20 and sets an average value of the distances as the radius of the ring-shaped multi-viewpoint imaging formation. Then, the suggestion-side control unit 14 divides the circumference of the ring-shaped multi-viewpoint imaging formation by a distance between the adjacent imaging devices 20 and sets a value obtained through this division as N which is the number of imaging devices 20.

In step S110, the suggestion-side control unit 14 determines the candidate states (arrangement candidates) (that is, acquires the candidate states) of the imaging devices 20 based on the imaging formation and N which is the number of imaging devices 20. For example, the suggestion-side control unit 14 determines the candidate positions of the imaging devices 20 such that the imaging devices 20 are arranged at the same interval in the ring-shaped multi-viewpoint imaging formation. Of course, any interval may be used as the interval between the imaging devices 20. The suggestion-side control unit 14 determines optical axis directions (candidate postures) such that the optical axes of the imaging devices 20 are oriented to the subject. Also, the suggestion-side control unit 14 sets the rotational angle (candidate posture) of each imaging device 20 to 0 degrees.

In step S120, the suggestion-side control unit 14 suggests the candidate states of the imaging devices 20. Specifically, the suggestion-side control unit 14 generates a plurality of plane images of the imaging devices 20 and displays the plane images in forms according to the candidate states, that is, at the display positions according to the candidate positions and display postures according to the candidate postures. That is, the display position of the plane image corresponds to the candidate position, and the optical axis direction and the rotational angle of the plane image correspond to the candidate posture.

Further, the suggestion-side control unit 14 generates the plurality of plane images of the imaging devices 20 and displays the plane images on the display unit 13a in forms according to the current installation states, that is, at display positions according to the current installation positions and display postures according to the current installation postures. Here, the suggestion-side control unit 14 displays the plane images indicating the current installation states and the plane images indicating the candidate states in different forms (for example, color coding). Further, the suggestion-side control unit 14 displays the plane images in accordance with the candidate states and the plane images not in accordance with the candidate states among the plane images indicating the current installation states in different forms (for example, color coding). Hereinafter, a display form of the plane image in accordance with the candidate state is referred to as an "accordant form" and a display form of the plane image not in accordance with the candidate state is referred to as a "discordant form." The suggestion-side control unit 14 may display the respective forms in a color coding manner, for example, in such a manner that the accordant forms are displayed blue and the discordant forms are displayed yellow (or red). Further, the suggestion-side control unit 14 also displays a subject image indicating a subject. Further, the suggestion-side control unit 14 may display a line image (an image connecting the plane images indicating the candidate states) indicating the imaging formation.

A display example is illustrated in FIG. 8. In FIG. 8, a plane image 20a indicates a current installation state and a plane image 20b indicates a candidate state. Optical axes 40a of the plane images 20a are all oriented toward a subject image 30a. Also, the installation states indicated by the plane images 20a are in accordance with the candidate states. The plane images 20a and 20b are displayed in the color coding manner. Also, in FIG. 8, a difference between display colors of the plane images 20a and 20b is expressed by presence or absence of hatching and a difference in a line type. A line image 20c indicates the ring-shaped multi-viewpoint imaging formation. The line image 20c is a circular image centered on the subject image 30a.

Another display example is illustrated in FIG. 9. In FIG. 9, plane images 20a and 20a' indicate current installation states and a plane image 20b indicates a candidate state. Optical axes 40a and 40a' of the plane images 20a and 20b are all oriented toward a subject image 30a. Also, the installation state indicated by the plane image 20a is in accordance with the candidate state and the installation state indicated by the plane image 20a' is not in accordance with the candidate state. The plane images 20a and 20a' are displayed in a color coding manner. In FIG. 9, a difference between the display colors of the plane images 20a and 20a' is expressed by presence or absence of hatching. Also, as in FIG. 8, the plane images 20a and 20b are displayed in the color coding manner. In this example, the number (4) of imaging devices 20 that constitute the imaging formation is less than the number (8) of imaging devices 20 illustrated in FIG. 8, and consequently the installation state indicated by the plane image 20a' is different from the candidate state. Also, in this formation, an image corresponding to a viewpoint at which no imaging is performed, that is, an interpolated image, can be produced based on a captured image captured at a viewpoint approximate to the viewpoint. Thus process is applicable to, for example, a free-viewpoint display device (a display device capable of viewing a picture from any viewpoint).

In step S130, the user newly installs the imaging devices 20 near the object 30 and turns on the power switches of the imaging devices 20. The suggestion-side control unit 14 detects newly added imaging devices 20 by performing the same process as step S100.

In step S140, the suggestion-side control unit 14 calculates the current installation states of the newly added imaging devices 20 by performing the same process as step S100.

In step S150, the suggestion-side control unit 14 suggests the current installation states of the newly added imaging devices 20. Specific processing contents are the same as those of step S120. A display example is illustrated in FIG. 10. In this example, a plane image 20a' is newly added to the example illustrated in FIG. 8. The plane image 20a' indicates the current installation state of the newly added imaging device 20. An installation state indicated by the plane image 20a' is different from the candidate state. For this reason, a display form of the plane image 20a' becomes a discordant form.

In step S160, the user moves the newly added imaging device 20 to a candidate position using the display contents on the display unit 13a as a clue and coordinates the posture and the candidate posture. Then, the user performs an operation of concluding the installation states. When this operation is performed, the suggestion-side control unit 14 decides whether the current installation states of the imaging devices 20 are in accordance with the candidate states. When the current installation states are in accordance with the candidate states, the suggestion-side control unit 14 changes the display form of the plane images to the accordant form. When the current installation states of the imaging devices 20 are different from the candidate states, the suggestion-side control unit 14 keeps the display form of the plane images as the discordant form. Also, when the current installation states of the imaging devices 20 are in accordance with the candidate states, the suggestion-side control unit 14 may automatically decide the installation states and may change the display form to the accordant form. Also, when the current installation states are in accordance with the candidate states, the suggestion-side control unit 14 may output any audio (for example, an alarm sound).

In step S170, the suggestion-side control unit 14 decides whether N imaging devices 20 are installed and the installation states thereof are in accordance with the candidate states. When it is decided that this condition is satisfied, the suggestion-side control unit 14 ends the present process. When it is decided that this condition is not satisfied, the present process returns to step S130.

(2-4-2. Another Example of Process of Suggesting Ring-Shaped Multi-Viewpoint Imaging Formation)

In the foregoing example, the process starts when the user installs only some of the imaging devices 20 among the imaging devices 20 that constitute the ring-shaped multi-viewpoint imaging formation. In this example, the user installs the number of imaging devices 20 that constitute the ring-shaped multi-viewpoint imaging formation in advance. Of course, the user may install more imaging devices 20 later.

First, the user installs the number of imaging devices 20 that constitute the ring-shaped multi-viewpoint imaging formation and turns on power switches thereof. The installation states of the imaging devices 20 are preferably determined in consideration of the ring-shaped multi-viewpoint imaging formation, but may be determined in consideration of any formation. An example of the installation states is illustrated in FIG. 12. In this example, eight imaging devices 20 are installed around an object 30 and all of the optical axes 40 of the imaging devices 20 are oriented toward the object 30. Also, the distances between the object 30 and the respective imaging devices 20 are substantially the same.

Subsequently, in steps S200 and S210, the suggestion-side control unit 14 performs the same process as step S100. Schematically, the suggestion-side control unit 14 detects the installed imaging devices 20 and calculates the current installation states of the imaging devices 20. Further, the suggestion-side control unit 14 also specifies the subject. Further, the suggestion-side control unit 14 suggests the current installation states of the imaging devices 20. Further, the suggestion-side control unit 14 determines the ring-shaped multi-viewpoint imaging formation as the imaging formation and determines eight as the number of imaging devices.

In step S220, the suggestion-side control unit 14 determines candidate states (arrangement candidates) of the imaging devices 20 based on the imaging formation and the number (eight) of imaging devices 20. Specific processing content is the same as that of step S110.

In step S230, the suggestion-side control unit 14 suggests the candidate states of the imaging devices 20. Specific processing content is the same as that of step S120. A display example is illustrated in FIG. 13. In this example, plane images 20a' and 20b, a line image 20c, and a subject image 30a are displayed. The plane images 20a' indicate the current installation states and the plane images 20b indicate the candidate states. The plane images 20a' and the plane images 20b are displayed in different forms. Also, since the installation states indicated by the plane images 20a' are all different from the candidate states, the installation states are displayed in a discordant form. Also, in the foregoing ring-shaped multi-viewpoint imaging formation, the angle of the field of each imaging device 20 may be displayed along with each plane image.

(2-4-3. Example of Process of Suggesting Series-Shaped Multi-Viewpoint Imaging Formation)

Next, an example of a process of suggesting a series-shaped multi-viewpoint imaging formation will be described. A specific process flow follows the flowchart illustrated in FIG. 5. For example, the user installs the imaging devices 20, as illustrated in FIG. 14. FIG. 14 illustrates the angle of the field of 45 degrees of each imaging device 20 in addition to each imaging device 20. On the other hand, the suggestion-side control unit 14 displays images illustrated in, for example, FIG. 15 by performing the processes of steps S10 to S30. In this example, plane images 20a and 20a' indicating current installation states of the imaging devices 20 and plane images 20b indicating candidate states of the imaging devices 20 are displayed. Also, angle-of-field images 45a, 45a', and 45b indicating the angles of the fields of the imaging devices 20 are also displayed. The plane image 20a is displayed in an accordant form and the plane images 20a' are displayed in a discordant form. The angle-of-field images 45a and 45a' indicate the angles of the fields in the current installation states of the imaging devices 20, and the angle-of-field images 45b indicate the angles of the fields in the candidate states of the imaging devices 20. Accordingly, the user can confirm an overlap state of the angles of the fields in the current installation states and an overlap state of the angles of the fields in the candidate states.

(2-4-4. Example of Process of Suggesting 360-Degree Panorama Imaging Formation)

Next, an example of a process of suggesting a 360-degree imaging formation will be described. A specific process flow follows the flowchart illustrated in FIG. 5. For example, the user installs one imaging device 20 or a plurality of imaging devices 20. On the other hand, the suggestion-side control unit 14 displays images illustrated in, for example, FIG. 16 by performing the processes of steps S10 to S30. In this example, a plane image 20a indicating a current installation state of the imaging device 20 and plane images 20b indicating candidate states of the imaging devices 20 are displayed. Also, angle-of-field images 45a and 45b indicating angles of fields of the imaging devices 20 are also displayed. The angle-of-field image 45a indicates the angle of the field in the current installation states of the imaging device 20, and the angle-of-field images 45b indicate the angles of the fields in the candidate states of the imaging devices 20. Accordingly, the user can confirm an overlap state of the angles of the fields in the current installation states and an overlap state of the angles of the fields in the candidate states.

(2-4-5. Example of process of suggesting pile imaging formation)

Next, an example of a process of suggesting a pile imaging formation will be described. A specific process flow follows the flowchart illustrated in FIG. 5. For example, the user installs one imaging device 20 or a plurality of imaging devices 20. On the other hand, the suggestion-side control unit 14 displays images illustrated in, for example, FIG. 17 by performing the processes of steps S10 to S30. In this example, rear images 20f and 20f indicating current installation states of the imaging devices 20 and a rear image 20g indicating a candidate state of the imaging device 20 are displayed. The installation state indicated by the rear image 20f is in accordance with the candidate state and the installation state indicated by the rear image 20f is different from the candidate state. The rear images 20f and 20f are displayed in different forms (for example, color coding). In FIG. 17, a difference between display colors of the rear images 20f and 20f is expressed by presence or absence of hatching.

2-5. Various Display Examples

The example of the process performed by the information processing device 10 has been described for each imaging formation in the above-described 2.4. Also, the display example of each process has been shown. However, display examples are not limited to the above-described examples. Thus, various display examples will be described in 2.5. Such display examples are, of course, also applicable to any of the above-described imaging formations.

(2-5-1. Example in which Front Images are Suggested)

The suggestion-side control unit 14 may display the current installation states and the candidate states using front images of the imaging devices 20. A display example is illustrated in FIG. 18. In this example, front images 20d and 20d' indicating current installation states of the imaging device 20 and front images 20e indicating candidate states of the imaging devices 20 are displayed. The installation state indicated by the front image 20d is in accordance with the candidate state and the installation states indicated by the front images 20d' are different from the candidate states. The front image 20d and the front images 20d' are displayed in a color coding manner. In FIG. 18, a difference between display colors of the front images 20d and 20d' is expressed by presence or absence of hatching. As is also apparent from this example, the suggestion-side control unit 14 suggests the front images, and thus the user can easily comprehend a difference between the current installation postures and the candidate postures of the imaging devices 20.

(2-5-2. Example in which Only Candidate States are Suggested)

In each of the above-described examples, both of the current installation state and the candidate state have been described. However, when the user knows at least the candidate states, the user can install the imaging devices 20 using the candidate states as references. Accordingly, the suggestion-side control unit 14 may suggest only the candidate states. A display example is illustrated in FIG. 19. In this example, the display of the current installation states is omitted in the example in which the above-described ring-shaped multi-viewpoint imaging formation is suggested. In this example, the user can install the imaging devices 20 in the ring-shaped multi-viewpoint imaging formation using the candidate states as references.

(2-5-3. Example in which Captured Images are Displayed)

Displaying captured images (pictures) which are captured by the imaging devices 20 for the user is preferable since the user can comprehend an overlap state of the captured images. Accordingly, the suggestion-side control unit 14 preferably displays the captured images of the imaging devices 20 when the candidate states of the imaging devices 20 are suggested. Further, the suggestion-side control unit 14 preferably displays the respective captured images in association with the current installation sates so that the user can easily comprehend which captured images being displayed correspond to which imaging devices 20. A display example is illustrated in FIG. 20. In this example, a display unit 13a is divided into right and left parts so that the left display region serves as a planar map display region 13a-1 and the right display region serves as a captured-image display region 13a-2. In addition, plane images 20a' indicating current installation states, plane images 20b indicating candidate states, and the like are displayed in the planar map display region 13a-1, and captured images are displayed in the captured-image display region 13a-2. In the captured-image display region 13a-2, the captured images are arranged in the vertical direction.

In this example, in the planar map display region 13a-1, plane images are displayed as a display example of the ring-shaped multi-viewpoint imaging formation. Also, the suggestion-side control unit 14 may cause an arrangement sequence of the plane images 20a' to be in accordance with an arrangement sequence of the captured images in order to associate the current installation states with the captured images. For example, the suggestion-side control unit 14 sets one plane image 20a' (for example, the plane image displayed at the closest position in the upper end of the display unit 13a among the plane images 20a') among the plane images 20a' as a criterion. Further, the suggestion-side control unit 14 gives a sequence number to each plane image 20a' clockwise from the plane image 20a' serving as the criterion. Then, the suggestion-side control unit 14 displays the captured images of the imaging devices 20 from the upper end of the captured-image display region 13a-2 according to the sequence number given to the plane image 20a' of each imaging device 20. The suggestion-side control unit 14 may display the plane image 20a' serving as the criterion in a different form (for example, color coding) from the other plane images 20a'.

For example, when plane images 20a'-1 to 20a'-3 correspond to imaging devices 21 to 23, respectively, the suggestion-side control unit 14 may set the plane image 20a'-1 as a criterion. Then, the suggestion-side control unit 14 may display the captured image of the imaging device 21 at the upper end of the captured-image display region 13a-2, display the captured image of the imaging device 22 at the second position from the top, and display the captured image of the imaging device 23 at the third position from the top. The foregoing criterion and sequence number may be selected by the user.

Also, the suggestion-side control unit 14 may change the display content of each region according to an installation state of the information processing device 10. Here, the installation state of the information processing device 10 is, for example, a concept including an installation position and an installation posture. The installation posture of the information processing device 10 is, for example, a concept including a direction (a direction of a vector extending in the longitudinal direction of the information processing device 10) of the information processing device 10.

That is, the suggestion-side control unit 14 may suggest the current installation states and the candidate states in a form according to the current installation state of the information processing device 10. Here, when the information processing device 10 has the same function as the position detection unit 34, the current installation state of the information processing device 10 can be detected.

For example, the suggestion-side control unit 14 may set the plane image 20a'-3 indicating the current installation state of the imaging device 23 as a criterion when the installation position of the imaging device 23 is closest to the current position of the information processing device 10. In this case, the plane image 20a'-3 is displayed in a different form from the other plane images 20a'. Also, a sequence number is given to each plane image 20a' clockwise from the plane image 20a'-3. Also, the captured image of the imaging device 23 is displayed in the uppermost portion of the captured-image display region 13a-2. Also, the suggestion-side control unit 14 may change the arrangement of the plane images 20a' and 20b so that the plane image 20a'-3 is displayed at the closest position to the upper end of the display unit 13a.

Also, when the suggestion-side control unit 14 detects the direction of the information processing device 10, the imaging device which is closest to the information processing device 10 among the imaging devices 20 in a direction in which the information processing device 10 is oriented may be set as a criterion.

Also, the suggestion-side control unit 14 may display identification information (for example, a product name or an ID) regarding each imaging device 20 or the above-described sequence number on a side of the plane image 20a' and the captured image. Also, when the suggestion-side control unit 14 divides the display unit 13a into a plurality of display regions and displays different information in the display regions, the information displayed in these display regions may simultaneously be displayed or only the information displayed in one display region may be displayed in response to an operation or the like of the user. Such information may be switched.

Another example is illustrated in FIG. 21. In this example, the display unit 13a is divided up and down so that the upper display region serves as a rear map display region 13a-3 and the lower display region serves as a captured-image display region 13a-4. Rear images 20m'-1, 20m'-2, and 20m'-3 indicating current installation states of the imaging devices 20 and rear images 20e' indicating candidate states of the imaging devices 20 are displayed in the rear map display region 13a-3. Also, captured images of the imaging devices 20 are displayed in the captured-image display region 13a-4. The installation state indicated by the rear image 20m-1 is in accordance with a candidate state and the installation states indicated by the rear images 20*m*'-2 and 20*m*'-3 are different from the candidate states. The rear image 20*m*-1 and the rear images 20*m*'-2 and 20*m*'-3 are displayed in a color coding manner. In FIG. 21, a difference between display colors of the rear image 20*m*-1 and the rear images 20*m*'-2 and 20*m*'-3 is expressed by presence or absence of hatching.

Also, the suggestion-side control unit 14 can display the captured images in association with the current installation states. For example, in this example, when the rear image 20*m*-1 indicates a current installation state of an imaging device 21, the suggestion-side control unit 14 displays a captured image of the imaging device 21 immediately below the rear image 20*m*-1. Likewise, when the rear image 20*m*'-2 indicates a current installation state of an imaging device 22, the suggestion-side control unit 14 displays a captured image of the imaging device 22 immediately below the rear image 20*m*'-2. When the rear image 20*m*'-3 indicates a current installation state of an imaging device 23, the suggestion-side control unit 14 displays a captured image of the imaging device 23 immediately below the rear image 20*m*'-3.

Another display example is illustrated in FIG. 22. In this display example, the suggestion-side control unit 14 suggests candidates states by suggesting adjustment content for coordinating current installation states of the imaging device 20 with the candidate states. Specifically, the suggestion-side control unit 14 displays captured images of imaging devices 21 to 29. Meanwhile, the suggestion-side control unit 14 displays arrow images 20*h*-3, 20*h*-4, 20*h*-6, and 20*h*-8 indicating the adjustment content for coordinating the current installation states of the imaging devices 23, 24, 26, and 28 with the candidate states such that the arrow images 20*h*-3, 20*h*-4, 20*h*-6, and 20*h*-8 are superimposed on the captured images of the imaging devices 23, 24, 26, and 28. For example, referring to the arrow image 20*h*-3, the user can coordinate the installation state of the imaging device 23 with the candidate state by rotating the imaging device 23 to the left side about the optical axis. Of course, this is an example and the arrow image may be superimposed on another captured image.

Also, the suggestion-side control unit 14 may give identification information regarding the imaging devices 20 to the captured images so that the user can easily comprehend to which imaging devices 20 the captured images being displayed correspond. Also, as in the example of FIG. 20, the suggestion-side control unit 14 may give a sequence number to each imaging device 20 in advance and display the captured image according to the sequence number. In this case, the suggestion-side control unit 14 preferably displays each imaging device 20 and the sequence number in contrast thereto so that the user can comprehend the sequence number given to each imaging device 20.

Another display example is illustrated in FIG. 23. In the above-described examples, particularly, in the display examples of FIGS. 20 and 22, relatively numerous captured images are displayed. However, when the information processing device 10 is, for example, a smartphone, the display unit 13*a* is small and it is thus not easy to display numerous captured images simultaneously in some cases. On the other hand, there is no problem in many cases as long as the user can simultaneously view only desired captured images. Accordingly, in this display example, when the user selects one plane image 20*a*', the suggestion-side control unit 14 displays only captured images corresponding to the selected plane image 20*a*' and plane images 20*a*' on both sides of this plane image 20*a*'.

Thus, the user can easily comprehend an overlap state between the desired captured images. Also, as a method of allowing the user to select the imaging device 20, for example, a method of allowing the user to touch the plane image 20*a*', can be exemplified. Of course, an embodiment of the present disclosure is not limited to this method. For example, when plane images 20*a*'-1 to 20*a*'-3 correspond to imaging devices 21 to 23 and the user touches the plane image 20*a*'-2, the suggestion-side control unit 14 displays the captured images of the imaging devices 21 to 23. The captured images are preferably displayed near the corresponding plane images 20*a*'.

Also, the suggestion-side control unit 14 may display only the captured image of the imaging device 20 selected by the user. In this case, the user is preferably allowed to select a plurality of imaging devices 20 (for example, adjacent imaging devices 20) and the suggestion-side control unit 14 preferably displays the captured images selected by the user simultaneously. This is because the user can easily comprehend an overlap state between the captured images.

Another display example is illustrated in FIG. 24. In this display example, the suggestion-side control unit 14 adds an icon image 10*a* indicating a current installation state of the information processing device 10 to the display example illustrated in FIG. 20. Specifically, the suggestion-side control unit 14 displays the icon image 10*a* in a planar map display region 13*a*-1. A display position of the icon image 10*a* corresponds to the current installation position of the information processing device 10 and a display posture corresponds to the current installation posture of the information processing device 10. Thus, since the user can easily comprehend a positional relation between each imaging device 20 and the information processing device 10, the current installation states of the imaging devices 20 can easily match display content of the display unit 13*a*. That is, the user can easily comprehend to which imaging device 20 each plane image 20*a*' corresponds. As a result, the user can easily coordinate the installation state of each imaging device 20 with the candidate state.

(Example in which Imaging Devices are Displayed from Plurality of Viewpoints)

In each of the above-described examples, only one kind of image has been displayed among the plane image, the front image, and the rear image of each imaging device 20, but a plurality of kinds of images may simultaneously be displayed. A display example is illustrated in FIG. 25. In this example, the display unit 13*a* is divided up and down. Plane images 20*a*-1, 20*a*'-2, 20*a*'-3, 20*b*-2, and 20*b*-3 and angle-of-field images 45*a*-1, 45*a*'-2, 45*a*'-3, 45*b*-2, and 45*b*-3 are displayed in an upper display region 13*a*-5. Rear images 20*m*-1, 20*m*'-2, 20*m*'-3, 20*e*'-2, and 20*e*'-3 are displayed in a lower display region 13*a*-6.

Also, the plane image 20*a*-1 and the rear image 20*m*-1 indicate a current installation state of an imaging device 21, and the angle-of-field image 45*a*-1 indicates an angle of a field in the current installation state of the imaging device 21. The current installation state of the imaging device 21 is in accordance with its candidate state. The plane image 20*a*'-2 and the rear image 20*m*'-2 indicate a current installation state of an imaging device 22, and an angle-of-field image 45*a*'-2 indicates an angle of a field in the current installation state of the imaging device 22. The current installation state of the imaging device 22 is different from its candidate state. The plane image 20*a*'-3 and the rear image 20*m*'-3 indicate a current installation state of an imaging device 23, and an angle-of-field image 45*a*'-3 indicates an angle of field in the current installation state of the imaging device 23. The current installation state of the imaging device 23 is different from its candidate state. Accordingly, the plane image 20*a*-1 and the rear image 20*m*-1, and the plane images 20*a*'-2 and 20*a*'-3 and the rear images 20*m*'-2 and 20*m*'-3 are displayed in a color coding manner. In FIG. 25, a difference between display colors of the images is expressed by presence or absence of hatching.

Also, the plane image 20*b*-2 and the rear image 20*e*'-2 indicate the same candidate state, and the angle-of-field image 45*b*-2 indicates an angle of a field in this candidate state. The plane image 20*b*-3 and the rear image 20*e*'-3 indicate the same candidate state, and the angle-of-field image 45*b*-3 indicates an angle of a field in this candidate state. In this example, since the user can simultaneously comprehend the candidate positions and the candidate postures of the imaging devices 20, the user can easily coordinate the installation states of the imaging device 20 with the candidate states.

(Example in which Candidate States are Guided Audibly)

Next, an example in which candidate states are guided audibly will be described. A display example is illustrated in FIG. 26. In this example, the suggestion-side control unit 14 displays captured images, as in FIG. 22. Specific processing content is as described in the example of FIG. 22. Also, the suggestion-side control unit 14 receives a captured image selection operation (for example, an operation of touching a captured image) performed by the user and displays the captured image selected by the user in a highlight manner. For example, when the captured image of the imaging device 24 is selected, the suggestion-side control unit 14 displays the captured image of the imaging device 24 in the highlight manner. Further, the suggestion-side control unit 14 audibly outputs the captured image selected by the user, that is, adjustment content for coordinating a current installation state of the imaging device 20 with a candidate state. For example, when the imaging device 24 is selected, the suggestion-side control unit 14 outputs an audio 20*j*-4, "a little to the left." Through this process, the user can easily coordinate the current installation state of the imaging device 20 with the candidate state.

(Example in which Candidate States are Displayed 3-Dimensionally)

In a display example, the suggestion-side control unit 14 displays candidate states of the imaging devices 20 using 3-dimensional images of the imaging devices 20 (bird's-eye images of the imaging devices 20). That is, in the above-described example, the current installation states and the candidate states of the imaging devices 20 are displayed as planar images. In this example, however, the states of the imaging devices 20 are displayed as 3-dimensional images. Display of the 3-dimensional images is achieved, for example, by imaging a 3D catalog.

Specifically, the suggestion-side control unit 14 defines a virtual space and arranges a 3-dimensional image indicating a current installation state of each imaging device 20 and a 3-dimensional image indicating a candidate state thereof in the virtual space. Here, the 3-dimensional image of each imaging device 20 may be stored in advance in the information processing device 10 or may be calculated in real time based on the current installation state and the candidate state. Then, the suggestion-side control unit 14 displays each 3-dimensional image in the virtual space from a desired viewpoint of the user. Also, when the user changes the viewpoint (or angle), the suggestion-side control unit 14 displays each 3-dimensional image in the virtual space from the changed viewpoint (or angle). Here, examples of the viewpoint changing operation include an operation of flicking a touch panel with a finger and a mouse dragging operation. Display examples are illustrated in FIGS. 27 and 28.

That is, for example, as illustrated in FIG. 27, the suggestion-side control unit 14 displays 3-dimensional images 20*j*-1 to 20*j*-3 indicating the current installation states of the imaging devices 21 to 23 and 3-dimensional images 20*k* indicating the candidate states of the imaging devices 21 to 23 in a superimposing manner. The suggestion-side control unit 14 preferably displays the 3-dimensional images 20*k* in a different form from the 3-dimensional images 20*j*-1 to 20*j*-3.

When the user performs the viewpoint changing operation, for example, as illustrated in FIG. 28, the suggestion-side control unit 14 displays the 3-dimensional images in the virtual space from the changed viewpoint. In the example illustrated in FIG. 28, the suggestion-side control unit 14 displays 3-dimensional images 20*j*-4 to 20*j*-6 indicating current installation states of imaging devices 24 to 26 and 3-dimensional images 20*k* indicating candidate states of the imaging devices 24 to 26 in a superimposing manner. Thus, the suggestion-side control unit 14 can seamlessly display the 3-dimensional images viewed from the different viewpoint. Also, the 3-dimensional images can express more various installation states than the planar images (plane images, front images, rear images, and the like). That is, the 3-dimensional images can express both of an installation position and an installation posture. Accordingly, the user can easily comprehend the candidate states of the imaging devices 20.

(Modification Example in which Candidate States are Displayed 3-Dimensionally)

In a modification example, the user acquires captured images (hereinafter also referred to as "installation state suggestion captured images") by imaging the imaging devices 20 using the information processing device 10. Then, the suggestion-side control unit 14 superimposes 3-dimensional images indicating candidate states of the imaging devices 20 on the installation state suggestion captured images. Here, the display positions of the 3-dimensional images correspond to the candidate positions and the display postures thereof correspond to the candidate postures.

The specific display example is the same as the above-described example. For example, in the example illustrated in FIG. 27, the user images the imaging devices 21 to 23, and the 3-dimensional images 20*j*-1 to 20*j*-3 indicating the current installation states of the imaging devices 21 to 23 are depicted in the installation state suggestion captured images. Further, the 3-dimensional images 20*k* indicating the candidate states of the imaging devices 21 to 23 are superimposed on the installation state suggestion captured images. The suggestion-side control unit 14 preferably displays the 3-dimensional images 20*k* in a different form from the 3-dimensional images 20*j*-1 to 20*j*-3.

On the other hand, in the example illustrated in FIG. 28, the user images the imaging devices 24 to 26, and the 3-dimensional images 20*j*-4 to 20*j*-6 of the imaging devices 24 to 26 are depicted in the installation state suggestion captured images. Further, the 3-dimensional images 20*k* indicating the candidate states of the imaging devices 24 to 26 are superimposed on the installation state suggestion captured images. The 3-dimensional images can express more various installation states than the planar images (plane images, front images, rear images, and the like). That is, the 3-dimensional images can express both of an installation position and an installation posture. Accordingly, the user can easily comprehend the candidate states of the imaging devices 20 by imaging the desired imaging devices 20.

Also, such examples are applicable to so-called wearable devices. When a wearable device is described as an example in which an electronic device is mounted on goggles, a glass surface of the goggles serves as the display unit 13a. The user views each imaging device 20 through the glass of the goggles. That is, the current installation states of the imaging devices 20 are displayed on the glass surface of the goggles. The suggestion-side control unit 14 (transparently) displays the 3-dimensional images indicating the candidate states of the imaging devices 20 on the glass surface of the goggles. Thus, when the user views the imaging devices 20 through the goggles, the user can comprehend the candidate states of the imaging devices 20, and thus can easily coordinate the installation states of the imaging devices 20 with the candidate states. In this process, the display of the candidate states is achieved by imaging so-called augmented reality (AR). Also, according to this process, the user can comprehend the candidate states even when the imaging devices 20 are not turned on.

The suggestion-side control unit 14 may select any of the above-described display examples (suggestion forms) and display the candidate states, the current installation states, and the like in the selected suggestion form or may display the candidate states, the current installation states, and the like in a suggestion form selected by the user. When the user is allowed to select the suggestion form, the suggestion-side control unit 14 may give identification information to each suggestion form in advance and display a list of the identification information. The user can select a desired suggestion form from the list. Also, the suggestion-side control unit 14 may select the suggestion form according to a layout or an aspect ratio of the display unit 13a. For example, when the information processing device 10 is a smartphone or a smart tablet, the display unit 13a is, for example, rectangular. Then, since the display unit 13a is used in one of a vertically long state (a state in which the longer side is oriented vertically) and a horizontally long state (a state in which the longer side is oriented horizontally), the aspect ratio is different in each state. For example, when the display unit 13a has a vertically long aspect ratio, the suggestion-side control unit 14 may display at least one of the current installation states and the candidate states, as illustrated in FIGS. 8 to 10, 13, 15 to 19, 27, and 28. Also, when the display unit 13a has a horizontally long aspect ratio, the suggestion-side control unit 14 may display more various kinds of information, as illustrated in FIGS. 20 to 26. Also, the suggestion-side control unit 14 may switch the suggestion form according to the imaging formation. Also, the suggestion-side control unit 14 may switch the suggestion form according to whether the information processing device 10 participates in imaging (an example in which the information processing device 10 participates will be described in a second embodiment).

Also, the suggestion-side control unit 14 may arbitrarily combine the above-described display examples. For example, the suggestion-side control unit 14 may suggest the above-described arrow images or audio even in different display examples. More specifically, for example, the suggestion-side control unit 14 may display an arrow image on a side of the plane image 20a illustrated in FIG. 20 or the like or may display an arrow image on a side of the plane image 20a selected by the user. When the user selects one plane image 20a, the suggestion-side control unit 14 may output the above-described audio. Also, the suggestion-side control unit 14 may superimpose an arrow image on the captured image illustrated in FIG. 20 or the like. Also, the suggestion-side control unit 14 may display a character image indicating adjustment content in each display example. Also, the suggestion-side control unit 14 may scale and display at least a part of each of the above-described display examples.

3. Second Embodiment (Example in which Information Processing Device Participate in Imaging)

In the first embodiment, the example in which the information processing device 10 does not participate in the imaging has been described. In a second embodiment, an example in which the information processing device 10 participates in imaging, that is, an example in which the information processing device serves as an imaging device, will be described.

(3-1. Configuration of Imaging Device)

First, the configuration of an imaging device 50 according to the second embodiment will be described with reference to FIG. 29. In the imaging device 50, as illustrated in FIG. 29, an imaging unit 15 is added to the information processing device 10. The imaging unit 15 can be realized by, for example, a hardware configuration similar to the configuration of the lens 200, the lens driving circuit 201, the image sensor 202, the AFE circuit 203, and the image processing circuit 204 of the imaging device 20. The imaging unit 15 generates a captured image and outputs the captured image to the suggestion-side control unit 14.

(3-2. Example of Process Performed by Imaging Device)

Next, an example of a process performed by the imaging device 50 will be described. Since the imaging device 50 has a configuration common to the configuration of the information processing device 10, the imaging device 50 can perform the same process as the process of the first embodiment. Additionally, in the second embodiment, the following display can be achieved.

That is, the suggestion-side control unit 14 can superimpose a captured image on a current captured image, the captured image being captured when an installation state of the imaging device 50 becomes a candidate state. A display example is illustrated in FIG. 30.

In FIG. 30, a captured image 60 indicated by a solid line represents a captured image which is currently being captured by the imaging device 50, and a captured image indicated by a dashed line represents a captured image captured when the installation state of the imaging device 50 becomes a candidate state. In this example, the user can easily comprehend how the imaging device 50 is moved from the current installation state to coordinate the installation state with the candidate state. Also, as illustrated in FIG. 30, a candidate position and a candidate posture may be displayed in addition to the current installation position and installation posture on the display unit 13a. These values may be globally used values such as latitudes and longitudes or may be distances (meters or the like) from a given criterion. Any value may also be used as the candidate posture. For example, vector components of a direction of an optical axis may be expressed as xyz coordinate values or polar coordinate values.

Also, this example is also applicable to so-called wearable devices. When a wearable device is described as an example in which an electronic device is mounted on goggles, a glass surface of the goggles serves as the display unit 13a. The user views a surrounding landscape through the glass of the goggles. When the installation state of the imaging device 50 becomes the candidate state, the suggestion-side control unit 14 (transparently) displays the landscape viewed by the user on the glass surface of the goggles. Accordingly, when the user views the landscape through the goggles, the user can comprehend the candidate state of the imaging device 50, and thus can easily coordinate the installation state of the imaging device 50 with the candidate state. In this process, the display of the candidate states is achieved by imaging so-called augmented reality (AR). Also, the present processing example is also applicable to a case in which the information processing device 10 does not participate in the imaging.

As described above, according to the above-described embodiments, since the suggestion-side control unit 14 performs the control such that the candidate states of the plurality of imaging devices 20 are suggested, the user can comprehend the candidate states of the plurality of imaging devices 20 easily and interactively. As a result, the user can easily coordinate the installation state of each imaging device 20 with the candidate state.

Also, since the suggestion-side control unit 14 performs the control such that the current installation states and the candidate states of the imaging devices 20 are suggested, the user can easily contrast the current installation states to the candidate states. Therefore, the user can coordinate the installation state of each imaging device 20 with the candidate state more easily.

Also, since the suggestion-side control unit 14 performs the control such that the installation states in accordance with the candidate states and the installation states that are different from the candidate states among the current installation states are suggested in different forms, the user can easily comprehend the imaging devices 20 of which the installation states are different from the candidate states. Therefore, the user can coordinate the installation states of the plurality of imaging devices 20 with the candidate states more easily.

Also, since the suggestion-side control unit 14 performs the control such that at least one candidate is suggested between the installation position and the installation posture of each imaging device 20, the user can comprehend the more detailed candidate states.

Also, since the suggestion-side control unit 14 performs the control such that angles of fields of the imaging devices 20 are suggested, the user can adjust the installation states while comprehending the angles of the fields of the imaging devices 20.

Also, since the suggestion-side control unit 14 performs the control such that captured images and the candidate states of the imaging devices 20 are suggested, the user can adjust the installation states of the imaging devices 20 while confirming the overlap states of the captures images.

Also, since the suggestion-side control unit 14 suggests adjustment content to coordinate the current installation states of the imaging devices 20 with the candidate states, the user can coordinate the installation states of the imaging devices 20 with the candidate states more easily.

Also, since the suggestion-side control unit 14 performs the control such that the current installation state and the candidate state of the information processing device 10 are suggested, the user can easily match the current installation states of the imaging devices 20 with the display content.

Also, since the suggestion-side control unit 14 performs the control such that the candidate states are suggested in a form in accordance with the current installation state of the information processing device 10, the user can easily match the current installation states of the imaging devices 20 with the display content.

Further, since the suggestion-side control unit 14 performs the control such that the candidate states are superimposed on images of the imaging devices displayed on a display surface (for example, the above-described glass surface), the user can easily contrast the current states to the candidate states.

Further, since the suggestion-side control unit 14 is able to switch between suggestion forms of the candidate states, the user can comprehend the candidate states in various suggestion forms.

Also, since the suggestion-side control unit 14 calculates the candidate states based on the current installation states of the imaging devices 20, the suggestion-side control unit 14 can calculate the candidate states more accurately.

Also, the suggestion-side control unit 14 determines a candidate formation which is a candidate for a formation of the plurality of imaging devices based on the current installation states of the imaging devices 20, and calculates the candidate states based on the candidate formation. Accordingly, the suggestion-side control unit 14 can calculate the candidate states more accurately.

The preferred embodiments of the present disclosure have been described above in detail with reference to the appended drawings, but the technical scope of the present disclosure is not limited to the example. It should be apparent to those skilled in the art of the present disclosure that various modification examples and correction examples can be made within the scope of the technical spirit and essence described in the claims, and the modification examples and the correction examples are, of course, construed to pertain to the technical scope of the present disclosure.

For example, in the foregoing embodiments, the candidate states have been suggested, but an embodiment of the present technology is not limited to the examples. For example, when the current installation states are different from the candidate states, a simple process of giving a given warning (performing audible announcement) may be performed.

Additionally, the present technology may also be configured as below.

(1)

An information processing device including:

an acquisition unit configured to acquire candidate states which are candidates for installation states of a plurality of imaging devices; and a control unit configured to perform control in a manner that the candidate states are suggested.

(2)

The information processing device according to (1), wherein the control unit performs control in a manner that current installation states and the candidate states of the imaging devices are suggested.

(3)

The information processing device according to (2), wherein the control unit performs the control in a manner that the installation states in accordance with the candidate states and the installation states that are different from the candidate states among the current installation states are suggested in different forms.

(4)

The information processing device according to any one of (1) to (3), wherein the control unit performs control in a manner that at least one candidate is suggested from among an installation position and an installation posture of each imaging device.

(5)
The information processing device according to any one of (1) to (4), wherein the control unit performs control in a manner that angles of fields of the imaging devices are suggested.

(6)
The information processing device according to any one of (1) to (5), wherein the control unit performs control in a manner that captured images captured by the imaging devices and the candidate states are suggested.

(7)
The information processing device according to any one of (1) to (6), wherein the control unit suggests the candidate states by suggesting adjustment content to coordinate current installation states of the imaging devices with the candidate states.

(8)
The information processing device according to any one of (1) to (7), wherein the control unit performs control in a manner that a current installation state of the information processing device and the candidate states are suggested.

(9)
The information processing device according to any one of (1) to (8), wherein the control unit performs control in a manner that the candidate states are suggested in a form in accordance with a current installation state of the information processing device.

(10)
The information processing device according to any one of (1) to (9), wherein the control unit performs control in a manner that the candidate states are superimposed on images of the imaging devices displayed on a display surface.

(11)
The information processing device according to any one of (1) to (10), wherein the control unit is capable of switching suggestion forms of the candidate states.

(12)
The information processing device according to any one of (1) to (11), wherein the acquisition unit calculates the candidate states based on current installation states of the imaging devices.

(13)
The information processing device according to (12), wherein the acquisition unit determines a candidate formation which is a candidate for a formation of the plurality of imaging devices based on the current installation states of the imaging devices, and calculates the candidate states based on the candidate formation.

(14)
An imaging device including:
an acquisition unit configured to acquire candidate states which are candidates for installation states of a plurality of imaging devices; and
a control unit configured to perform control in a manner that the candidate states are suggested.

(15)
A display control method including:
acquiring candidate states which are candidates for installation states of a plurality of imaging devices; and
performing control in a manner that the candidate states are suggested.

(16)
A program causing a computer to realize:
an acquisition function of acquiring candidate states which are candidates for installation states of a plurality of imaging devices; and
a control function of performing control in a manner that the candidate states are suggested.

(17)
A system including:
circuitry configured to
suggest candidate installation states corresponding to each of a plurality of imaging devices based on a relationship between current installation states of each of the plurality of imaging devices; and
output a suggested candidate installation state corresponding to at least one of the plurality of imaging devices based on the current installation state of each of the plurality of imaging devices and the determined candidate installation state.

(18)
The system of (17), wherein
the installation state corresponds to at least one of a position and installation posture of each of the plurality of imaging devices.

(19)
The system of any one of (17) to (18), wherein
the installation posture corresponds to a direction of an optical axis of an imaging surface of each of the plurality of imaging devices and a rotation angle of each of the plurality of imaging devices relative to the optical axis.

(20)
The system of any one of (17) to (19), wherein
the system is configured to acquire the information indicating a current installation state from each of the plurality of imaging devices via a communication link with each of the plurality of imaging devices.

(21)
The system of any one of (17) to (20), wherein the circuitry is configured to:
acquire sensor information output from each of the plurality of imaging devices; and calculate the information indicating the current installation state of each of the plurality of imaging devices based on the acquired sensor information.

(22)
The system of any one of (17) to (21), wherein the circuitry is configured to:
acquire image data captured by each of the plurality of imaging devices; and
calculate the information indicating the current installation state based on the acquired image data.

(23)
The system of any one of (17) to (22), wherein
the circuitry is configured to determine the candidate installation states based on an imaging mode corresponding to each of the plurality of imaging devices.

(24)
The system of (23), wherein
the imaging mode is a series-shaped multi-viewpoint imaging mode.

(25)
The system of (23), wherein
the imaging mode is a 360-degree panorama imaging mode.

(26)
The system of (23), wherein
the imaging mode is a ring-shaped multi-viewpoint imaging mode.

(27)
The system of (23), wherein
the circuitry is configured to determine the imaging mode based on the current installation state of each of the plurality of imaging devices.

(28)
The system of any one of (17) to (27), wherein
the circuitry is configured to calculate the candidate installation states based on the relationship between the current installation states of each of the plurality of imaging devices.

(29)
The system of any one of (17) to (28), wherein the circuitry is configured to:
determine the number of the plurality of imaging devices; and
determine the candidate installation states based on the determined number of the plurality of imaging devices.

(30)
The system of any one of (17) to (29), wherein
the circuitry is configured to control a display to display information indicating the suggested installation state corresponding to the at least one of the plurality of imaging devices.

(31)
The system of any one of (17) to (30), wherein
the circuitry is configured to output a suggested candidate installation state corresponding to each of the plurality of imaging devices.

(32)
The system of one of (17) to (31), wherein
the circuitry is configured to output a suggested candidate installation state corresponding to each of the plurality of imaging devices and information indicating the current installation state of each of the plurality of imaging devices.

(33)
The system of one of (17) to (32), wherein
the circuitry is configured to output information indicating the suggested candidate installation state in a first display form and information indicating the current installation state in a second display form that is different from the first display form.

(34)
The system of one of (17) to (33), wherein
the circuitry is configured to output a recommended installation posture of the at least one of the plurality of imaging devices.

(35)
The system of claim 1, wherein
the circuitry is configured to output a recommended angle of field of the at least one of the plurality of imaging devices.

(36)
The system of one of (17) to (35), wherein
the circuitry is configured to output display information including a first image corresponding to the suggested candidate installation state superimposed with a second image corresponding to the current installation state of the at least one of the plurality of imaging devices.

(37)
The system of one of (17) to (36), wherein
the circuitry is configured to control a display to display a suggested candidate installation state corresponding to each of the plurality of imaging devices, information indicating the current installation state of each of the plurality of imaging devices, and image data captured by each of the plurality of image capturing devices.

(38)
The system of one of (17) to (37), wherein
the circuitry is configured to control a display to display a first image corresponding to the candidate installation state superimposed with a second image corresponding to the current installation state of the at least one of the plurality of imaging devices, and image data captured by each of the plurality of image capturing devices.

(39)
The system of one of (17) to (38), further including:
a display, wherein
the circuitry is configured to control the display to display information indicating the suggested candidate installation state.

(40)
The system of one of (17) to (39), wherein
the circuitry is configured to output the suggested installation to the at least one of the plurality of imaging devices.

(41)
The system of one of (17) to (40), wherein the circuitry is configured to: detect installation of a new imaging device; and
determine new candidate installation states and output new a new suggested candidate installation state based on the detection.

(42)
The system of one of (17) to (41), wherein the circuitry is configured to:
acquire image data from each of the plurality of image capturing devices; and generate a composite image based on the acquired image data.

(43)
A non-transitory computer-readable medium including computer program instructions,
which when executed by a system, cause the system to:
suggest candidate installation states corresponding to each of a plurality of imaging devices based on a relationship between current installation states of each of the plurality of imaging devices; and
output a suggested candidate installation state corresponding to at least one of the plurality of imaging devices based on the current installation state of each of the plurality of imaging devices and the determined candidate installation states.

(44)
A method including:
suggest, by circuitry, candidate installation states corresponding to each of a plurality of imaging devices based on a relationship between current installation states of each of the plurality of imaging devices; and
outputting, by the circuitry, a suggested candidate installation state corresponding to at least one of the plurality of imaging devices based on the current installation state of each of the plurality of imaging devices and the determined candidate installation states.

REFERENCE SIGNS LIST

10 information processing device
11 input unit
12 communication unit
13 suggestion unit
13*a* display unit
13*b* audio output unit 14 suggestion control unit
15 imaging unit
20 imaging device
21 imaging unit
22 communication unit
23 suggestion unit
24 position detection unit
25 imaging-side control unit

The invention claimed is:

1. An information processing device comprising:
circuitry configured to
detect a current installation state of each of a plurality of imaging devices;
acquire candidate states which are candidates for installation states of the plurality of imaging devices, based on the current installation state of said each of the plurality of imaging devices, by determining an imaging formation and acquiring the candidate states based on the current installation state of said each of the plurality of devices, the imaging formation, and a number of the plurality of imaging devices; and
perform control in a manner that the current installation states and the candidate states are displayed in different forms by superimposing a captured image captured in one of the candidate states on a captured image captured in a corresponding one of the current installation states.

2. The information processing device according to claim 1, wherein the circuitry is configured to perform the control in a manner that the installation states in accordance with the candidate states and the installation states that are different from the candidate states among the current installation states are suggested in different forms.

3. The information processing device according to claim 1, wherein the circuitry is configured to perform control in a manner that at least one candidate is suggested from among an installation position and an installation posture of each imaging device.

4. The information processing device according to claim 1, wherein the circuitry is configured to perform control in a manner that angles of fields of the imaging devices are suggested.

5. The information processing device according to claim 1, wherein the circuitry is configured to perform control in a manner that captured images captured by the imaging devices and the candidate states are suggested.

6. The information processing device according to claim 1, wherein the circuitry is configured to suggest the candidate states by suggesting adjustment content to coordinate the current installation states of the imaging devices with the candidate states.

7. The information processing device according to claim 1, wherein the circuitry is configured to perform control in a manner that the current installation state of said each of the plurality of imaging devices and the candidate states are suggested.

8. The information processing device according to claim 1, wherein the circuitry is configured to perform control in a manner that the candidate states are suggested in a form in accordance with the current installation state of said each of the plurality of imaging devices.

9. The information processing device according to claim 1, wherein the circuitry is configured to perform control in a manner that the candidate states are superimposed on images of the imaging devices displayed on a display surface.

10. The information processing device according to claim 1, wherein the circuitry is configured to switch suggestion forms of the candidate states.

11. The information processing device according to claim 1, wherein the circuitry is configured to calculate the candidate states based on the current installation states of the imaging devices.

12. The information processing device according to claim 11, wherein the circuitry is configured to determine a candidate formation which is a candidate for a formation of the plurality of imaging devices based on the current installation states of the imaging devices, and calculate the candidate states based on the candidate formation.

13. An imaging device comprising:
circuitry configured to
detect a current installation state of each of a plurality of imaging devices;
acquire candidate states which are candidates for installation states of the plurality of imaging devices, based on the current installation state of said each of the plurality of imaging devices, by determining an imaging formation and acquiring the candidate states based on the current installation state of said each of the plurality of devices, the imaging formation, and a number of the plurality of imaging devices; and
perform control in a manner that the current installation states and the candidate states are displayed in different forms by superimposing a captured image captured in one of the candidate states on a captured image captured in a corresponding one of the current installation states.

14. A display control method comprising:
detecting, using circuitry, a current installation state of each of a plurality of imaging devices;
acquiring, using the circuitry, candidate states which are candidates for installation states of the plurality of imaging devices, based on the current installation state of said each of the plurality of imaging devices, by determining an imaging formation and acquiring the candidate states based on the current installation state of said each of the plurality of devices, the imaging formation, and a number of the plurality of imaging devices;
performing control, using the circuitry, in a manner that the current installation states and the candidate states are displayed in different forms by superimposing a captured image captured in one of the candidate states on a captured image captured in a corresponding one of the current installation states, and
adjusting the current installation state of said each of the plurality of imaging devices in accordance with the candidate states.

15. A non-transitory, computer-readable medium storing instructions that, when executed by a computer, control the computer to realize:
detecting a current installation state of each of a plurality of imaging devices;
acquiring candidate states which are candidates for installation states of a plurality of imaging devices, based on the current installation state of said each of the plurality of imaging devices, by determining an imaging formation and acquiring the candidate states based on the current installation state of said each of the plurality of devices, the imaging formation, and a number of the plurality of imaging devices; and
performing control in a manner that the current installation states and the candidate states are displayed in different forms by superimposing a captured image captured in one of the candidate states on a captured image captured in a corresponding one of the current installation states.

* * * * *